US009394887B2

(12) United States Patent
Roer et al.

(10) Patent No.: US 9,394,887 B2
(45) Date of Patent: Jul. 19, 2016

(54) WIND TURBINE NACELLE

(71) Applicant: Wobben Properties GmbH, Aurich (DE)

(72) Inventors: Jochen Roer, Ganderkesee (DE); Florian Sartorius, Leer (DE)

(73) Assignee: Wobben Properties GmbH, Aurich (DE)

( * ) Notice: Subject to any disclaimer, the term of this patent is extended or adjusted under 35 U.S.C. 154(b) by 24 days.

(21) Appl. No.: 14/367,174

(22) PCT Filed: Dec. 17, 2012

(86) PCT No.: PCT/EP2012/075820
§ 371 (c)(1),
(2) Date: Jun. 19, 2014

(87) PCT Pub. No.: WO2013/092502
PCT Pub. Date: Jun. 27, 2013

(65) Prior Publication Data
US 2015/0016976 A1    Jan. 15, 2015

(30) Foreign Application Priority Data

Dec. 21, 2011    (DE) .......................... 10 2011 089 431
Sep. 3, 2012    (DE) .......................... 10 2012 215 605

(51) Int. Cl.
| F03D 9/00 | (2016.01) |
| H02P 9/04 | (2006.01) |
| F03D 11/04 | (2006.01) |
| F03D 1/00 | (2006.01) |
| F03D 1/06 | (2006.01) |

(52) U.S. Cl.
CPC ............... *F03D 11/04* (2013.01); *F03D 1/001* (2013.01); *F03D 9/002* (2013.01); *F03D 13/20* (2016.05); *F03D 80/00* (2016.05); *F03D 1/0691* (2013.01); *F05B 2240/14* (2013.01); *F05B 2240/50* (2013.01); *Y02E 10/721* (2013.01); *Y02E 10/722* (2013.01); *Y02E 10/725* (2013.01); *Y02E 10/726* (2013.01); *Y02E 10/728* (2013.01); *Y10T 29/4932* (2015.01)

(58) Field of Classification Search
USPC ...................................................... 290/55, 44
See application file for complete search history.

(56) References Cited

U.S. PATENT DOCUMENTS

| 6,911,741 | B2 | 6/2005 | Pettersen et al. | |
| 7,084,522 | B2 | 8/2006 | Wobben | |
| 7,287,962 | B2 * | 10/2007 | Wobben ................. | F03D 1/001 415/905 |
| 7,443,066 | B2 | 10/2008 | Salamah et al. | |
| 7,944,076 | B2 * | 5/2011 | Stiesdal ................. | F03D 9/002 290/55 |
| 8,061,998 | B2 * | 11/2011 | Wobben ................. | F03D 1/001 416/244 R |
| 8,084,879 | B2 * | 12/2011 | Stiesdal ................. | F03D 9/002 290/55 |

(Continued)

FOREIGN PATENT DOCUMENTS

| DE | 10 2006 035 721 A1 | 3/2007 |
| DE | 10 2009 056 245 A1 | 6/2011 |

(Continued)

*Primary Examiner* — Pedro J Cuevas
(74) *Attorney, Agent, or Firm* — Seed Intellectual Property Law Group PLLC

(57) ABSTRACT

The invention relates to nacelle of a wind turbine. According to the invention, the wind turbine has a tower or mast, an aerodynamic rotor, and a generator having an electric-machine rotor and a stator, and the nacelle is provided with a nacelle covering, wherein the nacelle, in particular the nacelle covering, is self-supporting.

18 Claims, 17 Drawing Sheets

(56) References Cited

U.S. PATENT DOCUMENTS

| | | | | |
|---|---|---|---|---|
| 8,089,175 | B2* | 1/2012 | Stiesdal | F03D 9/002 290/55 |
| 8,198,749 | B2* | 6/2012 | Numajiri | F03D 1/0658 290/55 |
| 8,274,191 | B2* | 9/2012 | Stiesdal | F03D 9/002 290/55 |
| 8,405,243 | B2* | 3/2013 | Siegfriedsen | F03D 11/0008 290/55 |
| 8,669,685 | B2* | 3/2014 | Casazza | F03D 9/002 290/44 |
| 9,030,036 | B2* | 5/2015 | Stiesdal | F03D 9/002 290/55 |
| 9,279,413 | B2* | 3/2016 | Ebbesen | F03D 11/00 |
| 2004/0232704 | A1* | 11/2004 | Casazza | F03D 1/025 290/55 |
| 2005/0082836 | A1 | 4/2005 | Lagerwey | |
| 2006/0013689 | A1* | 1/2006 | Wobben | F03D 1/001 416/132 B |
| 2007/0102934 | A1 | 5/2007 | Pescarmona et al. | |
| 2007/0274838 | A1 | 11/2007 | Bagepalli et al. | |
| 2008/0050235 | A1* | 2/2008 | Wobben | F03D 1/001 416/142 |
| 2008/0164700 | A1 | 7/2008 | Bagepalli et al. | |
| 2009/0134627 | A1* | 5/2009 | Stiesdal | F03D 9/002 290/55 |
| 2009/0134628 | A1* | 5/2009 | Stiesdal | F03D 9/002 290/55 |
| 2009/0134629 | A1* | 5/2009 | Stiesdal | F03D 9/002 290/55 |
| 2009/0134630 | A1* | 5/2009 | Stiesdal | F03D 9/002 290/55 |
| 2010/0032961 | A1* | 2/2010 | Numajiri | F03D 1/0658 290/55 |
| 2010/0066096 | A1* | 3/2010 | Stiesdal | F03D 9/002 290/55 |
| 2010/0123318 | A1* | 5/2010 | Casazza | F03D 9/002 290/55 |
| 2010/0164232 | A1* | 7/2010 | Siegfriedsen | F03D 11/0008 290/55 |
| 2011/0171026 | A1 | 7/2011 | Kolpin et al. | |
| 2011/0278975 | A1* | 11/2011 | Holcomb | H02K 16/02 310/113 |
| 2012/0228881 | A1 | 9/2012 | Siegfriedsen | |
| 2012/0306212 | A1* | 12/2012 | Sarmiento Munoz | F03D 9/002 290/55 |
| 2013/0056173 | A1* | 3/2013 | Roer | F03D 11/00 165/47 |
| 2013/0084177 | A1* | 4/2013 | Eriksen | F03D 11/00 415/213.1 |
| 2013/0084182 | A1* | 4/2013 | Roer | F03D 7/0204 416/1 |
| 2013/0302175 | A1* | 11/2013 | Munk-Hansen | F03D 11/005 416/245 R |
| 2013/0315736 | A1* | 11/2013 | Frank | F03D 11/0008 416/170 R |
| 2013/0334819 | A1* | 12/2013 | Fricke | F03D 1/001 290/44 |
| 2014/0133985 | A1* | 5/2014 | Mongeau | F03D 9/002 416/95 |
| 2014/0219804 | A1* | 8/2014 | Bitsch | F03D 1/0658 416/215 |
| 2014/0314580 | A1* | 10/2014 | Lind | F03D 11/00 416/244 R |
| 2014/0346781 | A1* | 11/2014 | Airoldi | F03D 9/002 290/1 B |
| 2015/0180288 | A1* | 6/2015 | Roer | H02K 19/16 290/55 |
| 2015/0322922 | A1* | 11/2015 | Himmelmann | F03D 9/002 290/55 |
| 2015/0345464 | A1* | 12/2015 | Pedersen | F03D 1/0691 416/63 |

FOREIGN PATENT DOCUMENTS

| | | |
|---|---|---|
| EP | 1 356 204 A1 | 10/2003 |
| RU | 2075637 C1 | 3/1997 |
| RU | 2280786 C2 | 1/2005 |
| RU | 2406872 C1 | 12/2010 |
| WO | 2007/008884 A1 | 1/2007 |

* cited by examiner

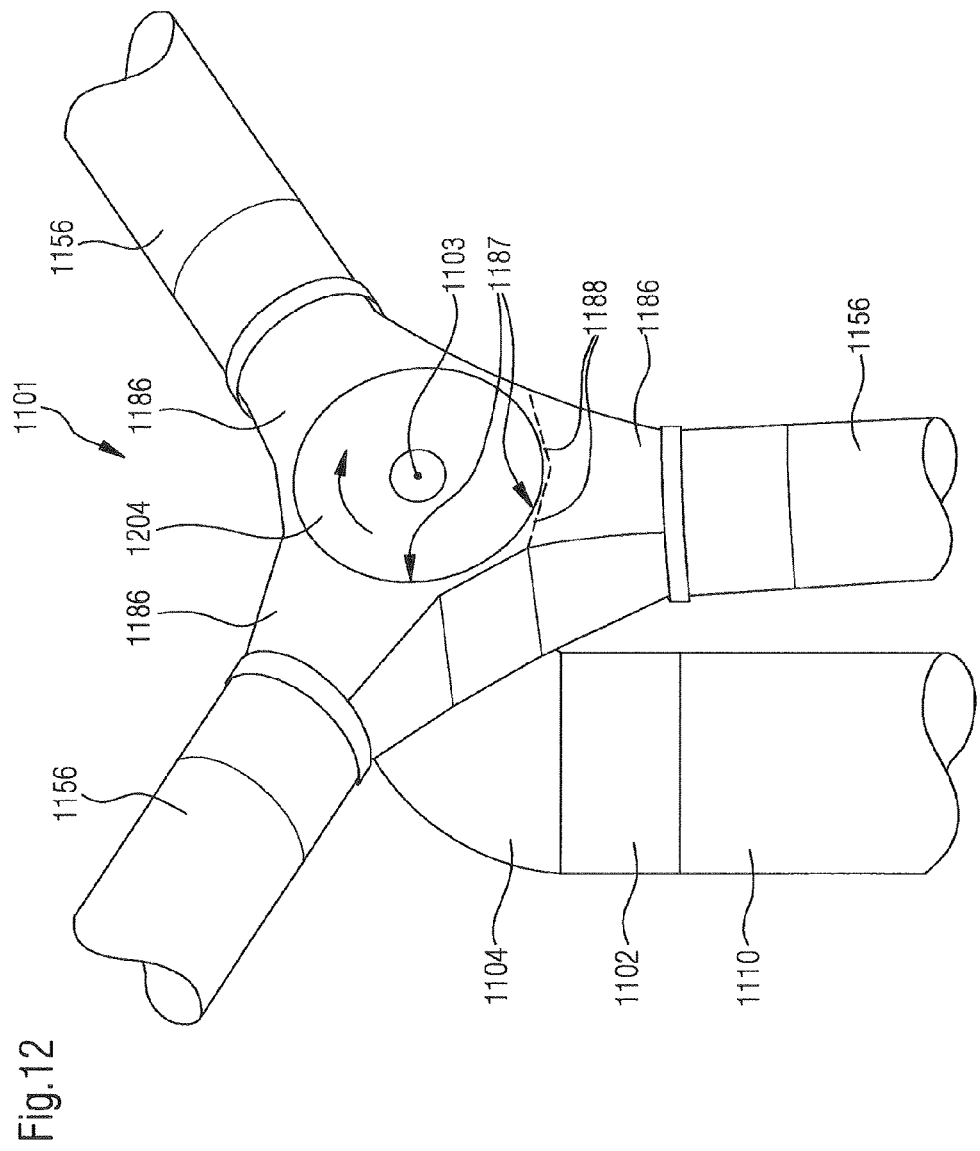

round, with hole straight, closed round, closed straight, with hole

WIND TURBINE NACELLE

BACKGROUND

1. Technical Field

The present invention concerns a pod of a wind power installation.

2. Description of the Related Art

Wind power installations are generally known. In a typical wind power installation as shown in FIG. 1 an aerodynamic rotor (106) is rotated by the wind and thereby generates electric energy by means of a generator. Such a generator and further components required for operation of the wind power installation are disposed in a pod. The further components can include for example an installation control system such as azimuth drives and the actuating system thereof, possibly a rectifier or frequency converter and the actuating system thereof, and heating or cooling means and the actuating system thereof, to give just some examples. In that case the electric devices are predominantly disposed in suitable switch cabinets arranged in the pod. In addition walkway and standing regions are to be provided so that service personnel can enter the pod and carry out maintenance, investigation or reconditioning operations. All those devices are arranged in the pod and protected in particular from wind and rain by a pod casing. In that case the pod casing basically completely encloses all units and in that arrangement is carried on a pod structure which also carries the walkway and standing regions and other devices.

In the case of a gearless wind power installation the generator also takes up some space. For example the air gap diameter of an Enercon E126 is about 10 m. Somewhat smaller types however at least frequently have an air gap diameter of about 5 m. In that case the generator can be carried with its stator on a machine carrier. Also fixed to the machine carrier is a shaft journal which by way of bearings carries the generator rotor which can also be referred to as the rotor member.

By virtue of its size, depending on the respective kind and size of the wind power installation, such a machine carrier can take up considerable space in the pod, in which case comparatively little space remains around the machine carrier.

In addition the machine carrier is frequently fixed to the azimuth bearing at the entire periphery thereof so that the pod can only be reached through the machine carrier from the pylon and thus through the azimuth bearing.

The German Patent and Trade Mark Office searched the following state of the art: DE 10 2006 035 721 A1, DE 10 2009 056 245 A1 and EP 1 356 204 B1.

BRIEF SUMMARY

One or more embodiments of the invention is directed to improving the pod structure of a wind power installation. At least the invention seeks to propose an alternative solution.

According to one embodiment therefore there is proposed a pod of a wind power installation having a pod casing which more specifically substantially represents the outer cover of the pod. It is proposed that that pod casing is of a self-supporting nature.

That firstly avoids on the one hand support structures within the pod. In that respect the structure of the pod is also simplified to that extent and supporting transverse or diagonal struts for supporting the pod casing are avoided within the pod and as a result additional space can be provided in the pod or can be available for another use.

Preferably the pod is of such a design configuration that the pod casing is fixed directly or if need be by way of fixing means, such as fasteners, to the azimuth bearing of the wind power installation. In particular in that way forces acting on the pod casing are applied by the pod casing directly to the azimuth bearing and from there further to the pylon or mast of the wind power installation. Those forces include at least the forces due to the weight of the pod casing and in particular also wind forces and/or forces due to weight acting on the pod casing and possibly dynamic forces of the devices fixed to the pod casing and/or forces due to weight and dynamic forces of the generator of the wind power installation with which electric energy is generated from the wind. Preferably also forces of the aerodynamic rotor, namely forces due to weight acting thereon, forces resulting from its movement and derived wind forces are carried by the pod casing and dissipated by way of the azimuth bearing.

In a configuration it is proposed that the pod casing carries the generator. Thus the components machine carrier and pod casing, as were previously known, are combined together to provide a new component which is referred to as the pod carrier. Accordingly the pod carrier substantially assumes the form of a pod casing, namely it forms the outer cover of the pod, but in that respect is of such a stable nature that it has the load-carrying capability of a machine carrier which is otherwise to be provided. In particular it is formed from a material and of a material strength which ensure that load-carrying capability. Therefore it is possible to dispense with a specific carrier or a specific support structure for the generator and instead the generator is fixed to the pod casing. The pod casing therefore carries the generator and preferably substantially assumes the function of a machine carrier for the generator. Thus, apart from the pod casing, the pod does not have any machine carrier which carries the generator of the wind power installation. Now, instead of a machine carrier which is substantially arranged internally in the pod and to which the generator was previously fixed and around which further devices were fixed, the pod now has an outer cover shell which is of such a sturdy and stable and stiff construction and which assumes the function of a machine carrier and encloses the parts to be carried.

As a result such a load-bearing pod casing is of substantially larger outside dimensions in comparison with a previous machine carrier arranged internally in a pod. In that way it is possible by virtue of such a load-bearing pod casing to implement equal stability and stiffness with significantly smaller material thicknesses, in comparison with a previous, inwardly disposed machine carrier. In addition, with the same outside dimensions, there is substantially more available space in the interior of the proposed self-supporting pod casing in comparison with the interior of a pod casing which is not self-supporting and which has to accommodate at least a machine carrier inside it.

In a preferred embodiment it is proposed that the wind power installation is gearless in such a way that the generator rotor member is rotated without mechanical transmission by the aerodynamic rotor. In the case of such a gearless wind power installation, there is usually a correspondingly large, slowly rotating generator. The nominal rotary speed can be in the region of 5 to 25 revolutions per minute, in particular in the region of 10 to 20 revolutions per minute, further preferably in the region of 12 to 14 revolutions per minute. In particular the generator is in the form of a ring generator in which the magnetically operative components of the stator and rotor member are respectively arranged substantially in a ring along the air gap. Usually such a generator has a large number of poles with numbers of pole pairs of at least 24, in particular at least 48, at least 72 or at least 192.

In particular such a generator is comparatively heavy and can weigh over 10 t, in particular over 50 t, in particular over 70 t. According to one or more embodiments of the invention, such a high weight can be carried by the proposed self-supporting pod casing insofar as the forces are diverted by way of a correspondingly strong external structure. In that respect the pod casing is a load-bearing part and can also be referred to as a pod shell.

In a preferred embodiment the pod casing has a rotating part and a stationary part. The rotating part carries the at least one, in particular the three rotor blades, of the aerodynamic rotor. In that case the rotating part of the pod casing forms the so-called spinner of the aerodynamic rotor and in that case forms a part of the aerodynamic rotor. In addition, at least but alternatively thereto, the rotating part of the pod casing carries the rotor member of the generator in the sense that the rotor member is fixedly connected to the rotating part of the pod casing and carries at least the forces due to the weight of the rotor member and further forces which occur in operation and which mechanically originate from the rotor member. Preferably the rotor member forms at least a carrier portion of the rotor member, a part of the rotating part of the pod casing.

The stationary part carries the stator of the generator. In that case there is provided at least one rotor bearing, by means of which the rotating part of the pod casing and therewith also the rotor member of the generator rotate relative to the stationary part of the pod casing and thus relative to the stator. Preferably the rotor member and stator are arranged in the proximity of that rotor bearing or in the proximity of one of the rotor bearings in order to be able to rotate relative to each other separated from each other only by a small air gap. In that case the rotating part of the pod casing is carried by the stationary part thereof by way of the rotor bearing or by way of the plurality of rotor bearings. In that case, by way of the rotor bearing or bearings, the stationary part of the pod casing carries the rotating part of the pod casing with the rotor member of the generator and with the one or more rotor blades, as well as further devices arranged on the rotating part of the pod casing, like for example pitch motors. The forces transmitted thereby to the stationary part by way of the rotor bearing or bearings are also diverted from the stationary part ultimately by way of an azimuth bearing or the like, in particular directly from the stationary part to the azimuth bearing. In that respect the term stationary part of the pod casing is used to mean that it is stationary in relation to the rotary movement of the rotor. In regard to an azimuth movement, that is to say a wind tracking movement, the stationary part is also mounted movably, namely mounted movably on said azimuth bearing.

Preferably the generator is in the form of an external rotor member, particularly in the case of the gearless wind power installation. Accordingly the rotor member rotates externally around the stator which is arranged radially inwardly relative thereto, with an air gap therebetween. Such a configuration is particularly advantageous for a generator which has an approximately ring-shaped rotor member which, due to the principle involved, as from the air gap, is of a smaller radial extent than the associated stator which can preferably also be a ring stator. In this case a generator can be constructed, which can be of a larger air gap diameter with the same outside diameter, in comparison with an internal rotor member.

In this case and also in other cases, the rotor member can be accommodated from the outside and stably carried by the load-bearing pod casing. Such a construction co-operates particularly advantageously with a separately excited synchronous generator in which a magnetic field is produced in the rotor member by a direct current. In particular in that way the rotor member can become warm and, by virtue of being accommodated in the pod casing disposed externally therearound, at least a part of the heat can be easily dissipated outwardly by way thereof. For example by heat conduction, through the self-supporting pod casing.

Preferably the entire load-bearing pod casing but at least a part of the rotating part and/or a part of the stationary part is in the form of a casting, in particular a spheroidal graphite iron casting or a few spheroidal graphite iron castings. In particular parts of the pod casing which have to carry lesser load-bearing forces such as for example a tail casing or tail part which faces away from the rotor can be made from another material such as for example aluminum. The use of a spheroidal graphite iron casting promotes heat conduction and in that respect, particularly when used with an external rotor member, can promote the dissipation of heat from the external rotor member. One or more welded parts can also be used.

In an advantageous embodiment it is proposed that the pod is provided with a ring gear with an internal tooth arrangement for azimuth adjustment of the pod. That ring gear is fixedly connected to the pod and has an internal tooth arrangement into which one or more azimuth drives can engage with a respective pinion in order thereby to track the pod with the wind. With this proposal therefore azimuth drives are arranged stationarily in the pylon or possibly the mast and perform wind tracking by the ring gear with internal tooth arrangement being correspondingly rotated about a substantially vertical axis. The ring gear is fixedly connected to the pod which thus correspondingly rotates therewith.

In that way, in comparison with previously conventional variants in which the azimuth drives are disposed in the pod, further space can be provided in the pod. In addition, uniform distribution of the azimuth drives in the peripheral direction is possible. The azimuth drives can be distributed at uniform angular spacings, for example 12 azimuth drives can be so uniformly distributed that an azimuth drive is arranged every 30°. That ensures a uniform transmission of force to the ring gear, whereby the loading on the azimuth bearing and thus the wear thereof can be reduced.

In an embodiment it is proposed that the pod has a working platform extending through the generator. Accordingly the pod is of such a configuration that regions in front of and behind the generator and thus also regions towards the aerodynamic rotor can be reached with one and the same working platform. That working platform is thus permanently installed and is accessible by a person on foot. Preferably it can also be accessed over its entire distance in on-going operation of the installation.

It is further proposed that the pod is provided for a wind power installation having a generator with a nominal power output of more than 1 MW. That emphasizes the nature of the design configuration of the pod in the form of a self-supporting pod in the sense that heavy rotor blades and generator components can be carried. A pod structure for a wind power installation with a nominal power output of 1 MW or more is of a size which necessitates specific preliminary stability investigations for the load-bearing structure. The man skilled in the art can carry out such stability investigations if he has information about the basic structure of that pod, as can be seen for example from the Figures. For smaller and in particular markedly smaller wind power installations, such questions of stability and stiffness of the basic structure play a subordinate part, for many different reasons. They include the point that a smaller generator can be more compact and thus the generator involves a basic stiffness which fundamentally does not require any further support. In addition smaller wind power installations are of lesser weight and have smaller rotor blade lengths and rotor blade surface areas, whereby a wind force acting on the rotor blades is also reduced. In that way lower forces are required for any load-bearing structures, whereby those load-bearing structures in turn can be weaker and thus lighter. In addition there are basically no transport problems for smaller wind power installations. More specifically, transport problems arise in particular due to given maximum dimensions which are predetermined by the road system and which therefore practically cannot be influenced by wind power installation manufacturers. Thus for example an outside diameter for a generator of 5 m is a critical size which frequently cannot be exceeded for on-road transport. Smaller wind power installations do not encounter such problems by virtue of transportable maximum sizes.

Preferably the pod can be accessed on foot. That means that the pod is so large that an adult person can pass in the pod without stooping over. In that case the person passes within the load-bearing structure, namely within the load-bearing pod casing. It is in that respect that the proposed pod differs quite substantially also from small wind power installations in which it is sometimes difficult to distinguish between a machine carrier and a pod. Particularly wind power installations which are reached from the exterior for maintenance purposes fall into an entirely different category in that respect.

In an embodiment the pod is characterized in that provided between a shaft journal portion and the pylon is a connecting portion which connects the shaft journal portion to the pylon and which is of an outside shape that is angled or bent from the pylon to the shaft journal portion. In particular this involves a tubular shape which is angled through 90° or bent through 90° approximately. The hub portion is arranged in the region of the generator and the aerodynamic rotor and provided for carrying the generator and the aerodynamic rotor. That can be done by way of at least one or two bearings. The shaft journal portion can be for example in the form of a cone portion or a conical portion, in particular a front cone portion. In that case that shaft journal portion can have a substantially horizontal center line which can coincide with an axis of rotation of the aerodynamic rotor and/or the generator rotor member.

The connecting portion is thus of a substantially tubular configuration, wherein that tube or tubular shape is angled or curved in particular through about 90°. That tubular shape or that tubular connecting portion preferably has an annular pylon connecting region at one side and an annular shaft journal connecting region at its other side. Those two annular connecting regions arranged approximately at 90° relative to each other are connected by that tubular connecting portion which thus connects the pylon to the shaft journal portion.

In an embodiment it is proposed that the rotating part has blade connections for fixing a respective rotor blade to the rotating part. That hub portion is in particular the described rotating part of the pod or it is a portion of said rotating part of the pod. The blade connections extend in the axial direction, namely relative to the axis of rotation of the aerodynamic rotor, which preferably coincides with the axis of rotation of the generator, over a blade connecting region which can also be referred to as an axial blade connecting region. The generator also extends in the axial direction within that blade connecting region or axial blade connecting region. In that case the generator can also be shorter in the axial direction than the axial blade connecting region. At any event it is proposed that the generator is not disposed in front of or behind the blade connection in the axial direction. As a result, a flow of force from the aerodynamic rotor to the rotor member and finally by way of the magnetic field also to the stator is improved or even optimized. In particular a flow of force is avoided which, coming from the rotor blades, has to flow from the blade connections partly in the axial direction to the generator rotor member.

The blade connections can moreover also be in the form of blade connecting adapters or can be connected thereto. In that case a respective rotor blade is initially connected to a blade connecting adapter and that blade connecting adapter would then be fixed to the blade connection. The blade connecting adapter in that case forms in particular approximately a short tubular portion, namely of a short length in comparison with its periphery.

In addition or alternatively it is proposed that the generator is arranged in relation to the axis of rotation in the radial direction within the blade connections. The blade connections and thus the rotor blades thus surround the generator.

In particular therefore a configuration is proposed, in which, in the case of a generator in the form of an external rotor member, the external rotor portion becomes the rotor hub and is fitted directly within the blade connections or hub adapter connections. The stator which is correspondingly disposed inwardly becomes a part of the shaft journal portion of the pod. That part is in the form in particular of a front cone portion on the pod. The stator therefore becomes a part of a shaft journal or the shaft journal portion of the self-supporting pod, which corresponds to a shaft journal. In particular this also involves integration of generator and blade connecting region.

In that way it is possible inter alia to provide that as few components as possible and a weight which is correspondingly as low as possible is required, which in turn can lead to a reduction in costs. It is possible to avoid too many individual parts, an additional casing which is complicated and expensive to fit, and unnecessary material expenditure, due to a disadvantageous flow of force in the drive train. Instead, a simplification in assembly, a reduction in the individual parts on the building site and an application of force which is as direct as possible from the rotor blade to the generator can be achieved or can thereby be at least sought to be achieved. In addition any additional pod hood can also become superfluous if the blade connecting region also structurally encloses the generator in such a way that the generator is thereby adequately encapsulated and protected from the influences of weather.

Particularly if the generator is of a very long structural shape and is of a greater axial length than the blade connecting region, the generator can also extend in an axial direction beyond the blade connecting region, at at least one side. In addition there is proposed a wind power installation comprising a pylon or mast and a pod according to one of the above-described embodiments. It is desirable if such a wind power installation has at least one azimuth drive, in particular a plurality of azimuth drives, which are arranged fixedly in the pylon or mast and which engage with a respective pinion on a ring gear which is fixedly connected to the pod and which has an internal tooth arrangement. A robust wind power installation which can be constructed at a comparatively low level of complication and expenditure is proposed thereby.

There is also proposed a method of constructing a wind power installation, in particular constructing a wind power installation as described hereinbefore. In that respect it is proposed that the rotor member and the stator of the generator are already connected together by means of a bearing before lifting for installation on a pylon. Therefore this avoids assembling the rotor member and the stator at a great height of the pod on the pylon and instead there is proposed pre-production in the factory and/or pre-production on the ground at the building site.

Preferably electric devices are already pre-installed in the pod before the latter is lifted for being fitted on the pylon. In that way also assembly can be simplified and in addition sources of error in the assembly operation are minimized thereby.

BRIEF DESCRIPTION OF THE SEVERAL VIEWS OF THE DRAWINGS

The invention is described in greater detail hereinafter by way of example by means of embodiments with reference to the accompanying Figures.

FIG. 12 shows a perspective view of the FIG. 11 pod.

DETAILED DESCRIPTION

Hereinafter identical references can denote similar but non-identical components. In addition the same components can be shown on different scales.

Figure 1:
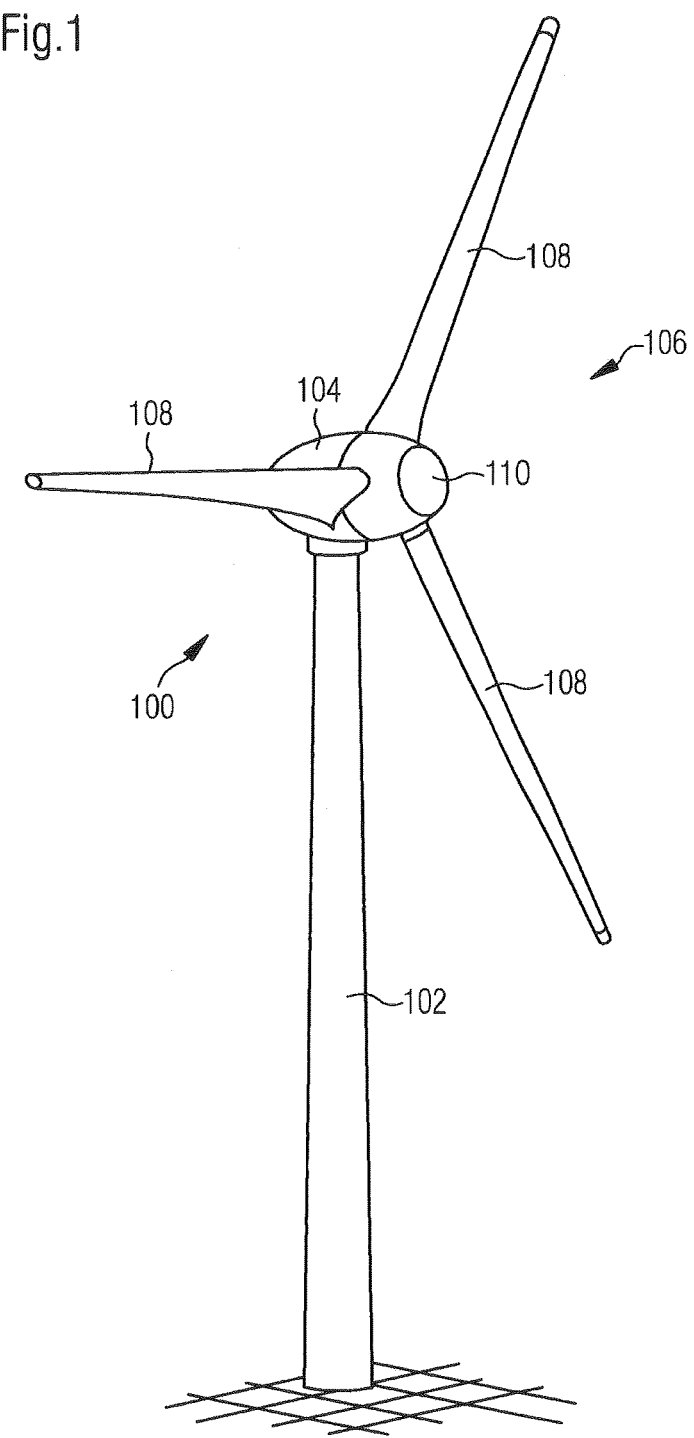
FIG. 1 shows a simplified perspective view of a wind power installation.
Figure 1A:
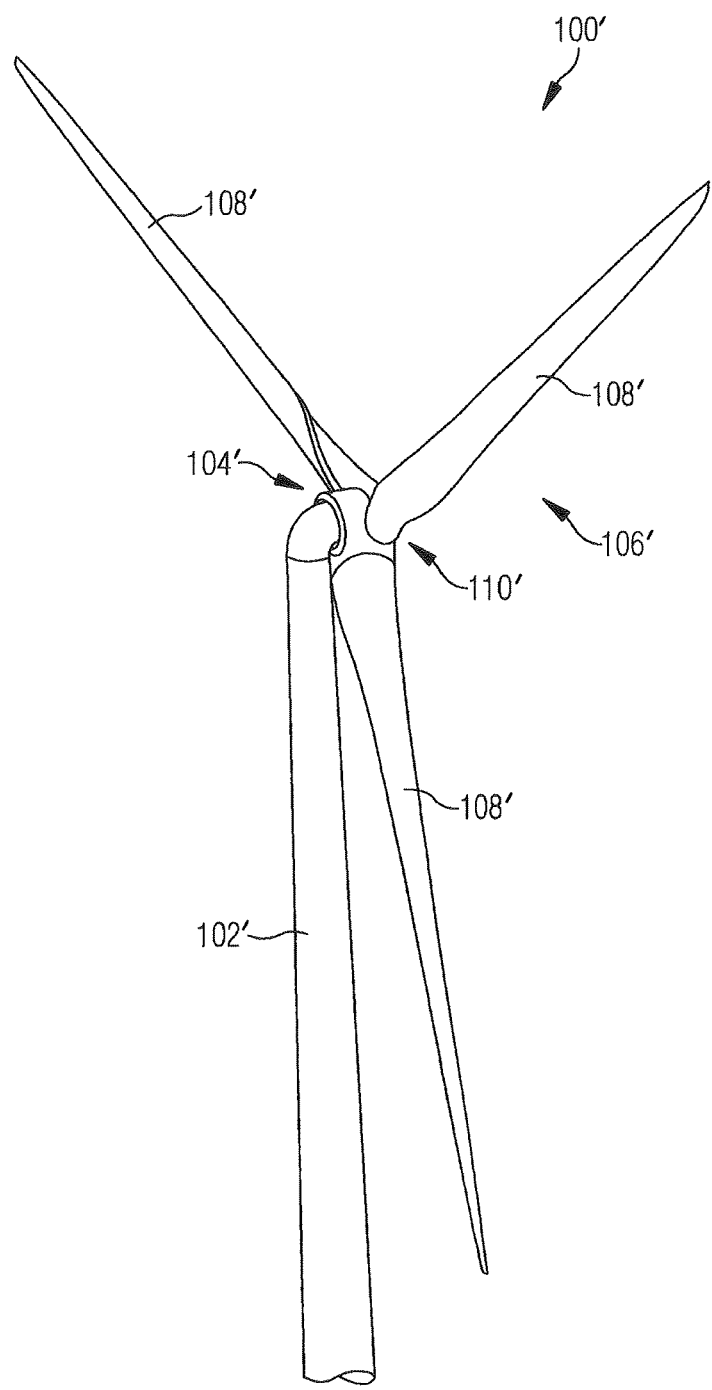
FIG. 1a shows a simplified perspective view of a wind power installation according to an embodiment of the invention, FIG. 2 diagrammatically shows a perspective sectional view of a pod according to an embodiment the invention.

FIGS. 1 and 1a each show a wind power installation 100, 100' having a pylon 102, 102' and a pod 104, 104'. Arranged on the pod 104, 104' is a rotor 106, 106' with three rotor blades 108, 108' and a spinner 110, 110'. The rotor 106, 106' is caused to rotate in operation by the wind and thereby drives a generator in the pod 104, 104'.

Figure 2:
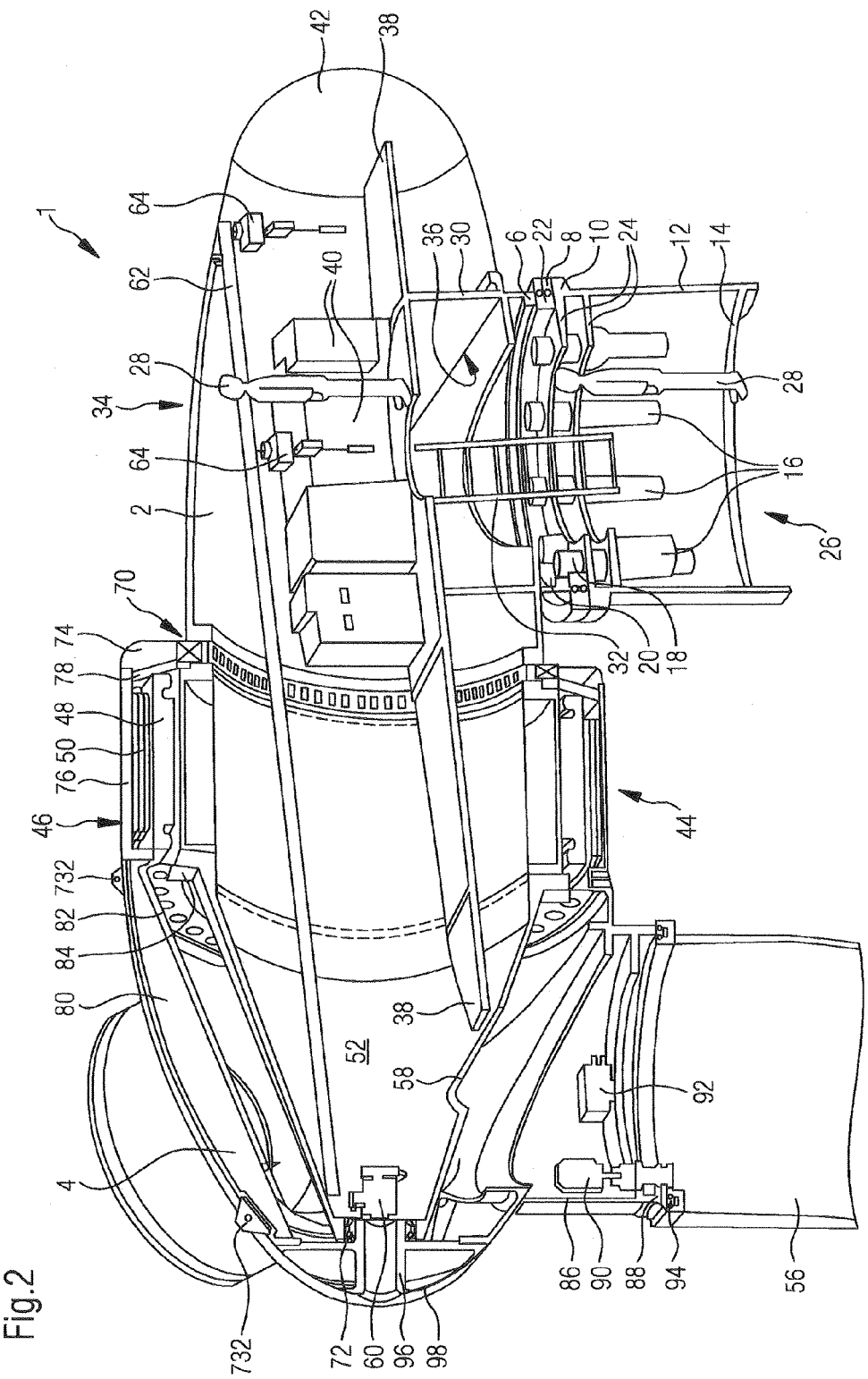

The pod 1 in FIG. 2 has a stationary part 2 and a rotating part 4. The stationary part 2 extends far into the rotating part 4. The stationary part 2 is fixed by way of an azimuth flange 6 to an azimuth bearing 8 which in turn is fixed to a pylon flange 10 of a pylon 12. Of the pylon 12, only its upper region, namely its pylon head 26 with a working platform 14 is shown.

Azimuth drives 16 are arranged in the pylon 12 in the proximity of the pylon flange 10 and in the proximity of the azimuth bearing 8. The azimuth drives 16 each have an only indicated pinion 18 engaging a ring gear 20 with an internal tooth arrangement. The internal tooth arrangement is not further shown. The ring gear 20 can be connected to an inner bearing ring 22 of the azimuth bearing 8 and is thereby or in some other fashion connected to the azimuth flange 6 and thereby to the pod 1, namely to the stationary part 2 of the pod 1. The azimuth drives 16 which are fixedly installed in two ring discs 24 in the pylon 12 can move the pod 1 in tracking relationship with the wind by suitable azimuth displacement.

The ring discs 24 are fixedly installed at the height of the pylon flange 10 and thereby lead to a high level of stiffness of the pylon 12 in the illustrated pylon head 26. The illustrated people 28 show the size relationships in the pylon head 26 and also in the pod 1.

The stationary part 2 of the pod 1 is fixed to the described azimuth flange 6 on the azimuth bearing 8 and thus the pylon head 26 by way of a tubular carrier portion 30 which also serves for stiffening and stabilizing the pod 1. Thus forces which act on the pod 1 are also diverted to the pylon 12 by way of that tubular carrier portion 30. From the pylon 12, a person 28 can reach the pod 1 by way of a ladder 32 through the ring discs 24, the azimuth bearing 8 and the tubular carrier portion 30. All those components provide sufficient space for a person 28 to be able to pass into the pod 1 and also for articles to be able to pass from the pylon 12 into the pod 1.

The stationary part 2 of the pod 1 has a tubular belt region 34. In a connecting region 36 which in the mathematical sense forms an intersection region of the tubular carrier portion 30 and the tubular belt region 34 the tubular carrier portion 30 and the tubular belt region 34 are fixedly connected together. The tubular carrier portion 30 and the tubular belt region 34 can also be at least portion-wise made from one piece, as for example in the form of a casting. The connecting region 36 extends three-dimensionally in space and can thereby receive widely varying force directions from the pod 1 and pass them into the pylon 12.

Coming from the pylon 12, the tubular carrier portion 30 ends at the height of a platform 38. The platform 38 essentially serves for a person, in particular service personnel, to be able to gain entry to the pod 1 and work there. In addition items of equipment such as for example control cabinets 40 are arranged on the platform 38, for different purposes. In addition the platform 38 can also contribute to increasing the stability and in particular stiffness of the pod 1. Persons in the pod can move on the platform 38 in extensive parts thereof and with a great deal of available space.

The pod 1 has a rear portion 42 which in regular use is facing away from the wind. That rear portion 42 can contribute to the stability and in particular stiffness of the pod 1, but otherwise carries fewer mechanical forces than the tubular carrier portion 30 and the tubular belt region 34. For that reason the rear portion 42 can be of a weaker structure for example from the point of view of its material strength or its kind of material. For example the use of aluminum is proposed for that rear portion 42.

A generator portion 44 forwardly adjoins the belt region 34. The generator 46 is disposed in the generator portion 44.

The generator 46 includes a stator 48 and a generator rotor member 50 which is in the form of an external rotor member, that is to say it is arranged externally around the stator 48. Both the stator 48 and also the rotor member 50 are of an approximately annular configuration. The stator 48 is fixedly connected to the stationary part 2 of the pod 1. In that way the stator 48 which is of a comparatively great mass and thus great weight is carried by the stationary part 2 and thus by the pod 1. It will be clear from the illustrated person 28 that the size relationships readily allow a person on the platform 38 to be able to pass to the generator 46 and through same. In that respect the platform 38 basically only adjoins elements of the stationary part 2 and thus access on foot thereto is possible even in on-going operation of the wind power installation.

Adjoining the generator portion 44 of the stationary part 2 is a front portion 52 which can also be referred to as the front cone portion 52. That cone portion 52 basically replaces a previously known shaft journal. The front cone portion 52 which is part of the stationary part 2 of the pod 1 is disposed in the region of the aerodynamic rotor 54 which has three rotor blades 56, of which only one is shown in its region of attachment. The front cone portion 52 has, adjacent to the platform 38, a maintenance opening 58 through which a person can pass from the stationary part 2 into the rotating part 4 and in particular to the rotor blade 56 or into associated devices.

In addition a slip ring body 60 is accessible from the front cone portion 52. The slip ring body 60 serves to transmit electric signals, either now information signals or energy signals, from the stationary part 2 to the rotating part 4 or vice-versa. In addition, disposed in the pod 1 and thus in the stationary part 2 is a crane rail 62 extending from the rear portion 42 to the front cone portion 52 and there to the slip ring body 60. The crane rail 62 carries an electric winch 64 for handling heavy articles, including tools, being shown in two positions. The winch 64 can basically be displaced along the crane rail 62 to the slip ring body 60 and thus for example can lift loads in the pylon 12 and convey them to the front cone portion 52 and there for example to the rotor blade 56.

The rotating part 4 of the pod 1 is mounted on the stationary part 2 rotatably about a substantially horizontal axis by means of a rear bearing 70 and a front bearing 72. The rear bearing 70 is arranged in the proximity of the generator 46, approximately adjacent to the stator 48. Provided on the rotating part 4 in the region of the rear bearing 70 is a cover apron 74 protecting the rear bearing 70 from the influences of weather.

An annular carrier structure 78 extends to the rear bearing 70, from a rotor member casing portion 76 which carries the rotor member 50 and which surrounds it in the manner of a cylindrical casing. That arrangement provides that the rotating part 4 of the pod 1 is carried in that rear region of the rotating part 4 on the rear bearing 70.

Adjoining the rotor member casing portion 76 is a hub portion 80. The hub portion 80 is fixed in the rotor member casing portion 76 and also provided in that region is a brake disc 82 which can stop the rotor member 50 by means of the brake means 84, which may be required in particular for maintenance activities. Arranged on the hub portion 80 are rotor blade attachments 86 each having a rotor blade connection 88 for fixing a respective rotor blade 56. Arranged in the rotor blade attachment 86 is a pitch drive 90 with a respective associated pitch box 92. Such a pitch box 92 is used to operate the pitch motors and can contain actuating units and/or energy storage means for emergency displacement or the like. The pitch box 92 is illustrated here by way of example for further modules for actuating or powering the pitch drives. In that way the angle of incidence of the rotor blade 56 can be altered and for that purpose the rotor blade 56 is mounted rotatably to the blade connection 88 by way of a blade bearing 94. Other embodiments may also have a plurality of pitch drives for each rotor blade.

The rotating part 4 of the pod 1 is received in the front bearing 72 by means of a bearing support 96. Thus the rotating part 4 is supported internally with its bearing support 96 in the front bearing 72 and the stationary part 2 is here connected from the outside to the front bearing 72. The bearing support 96 of the rotating part 4 is thus arranged in the region of the front bearing 72 within the stationary part 2 whereas otherwise the rotating part 4 rotates externally around the stationary part 2, in particular around the front cone portion 52 and the generator portion 44. That permits interchangeability of the front bearing 72 from the interior of the stationary part 2 of the pod 1. The crane rail 62 can also be helpful for such interchange activity.

Figure 3:
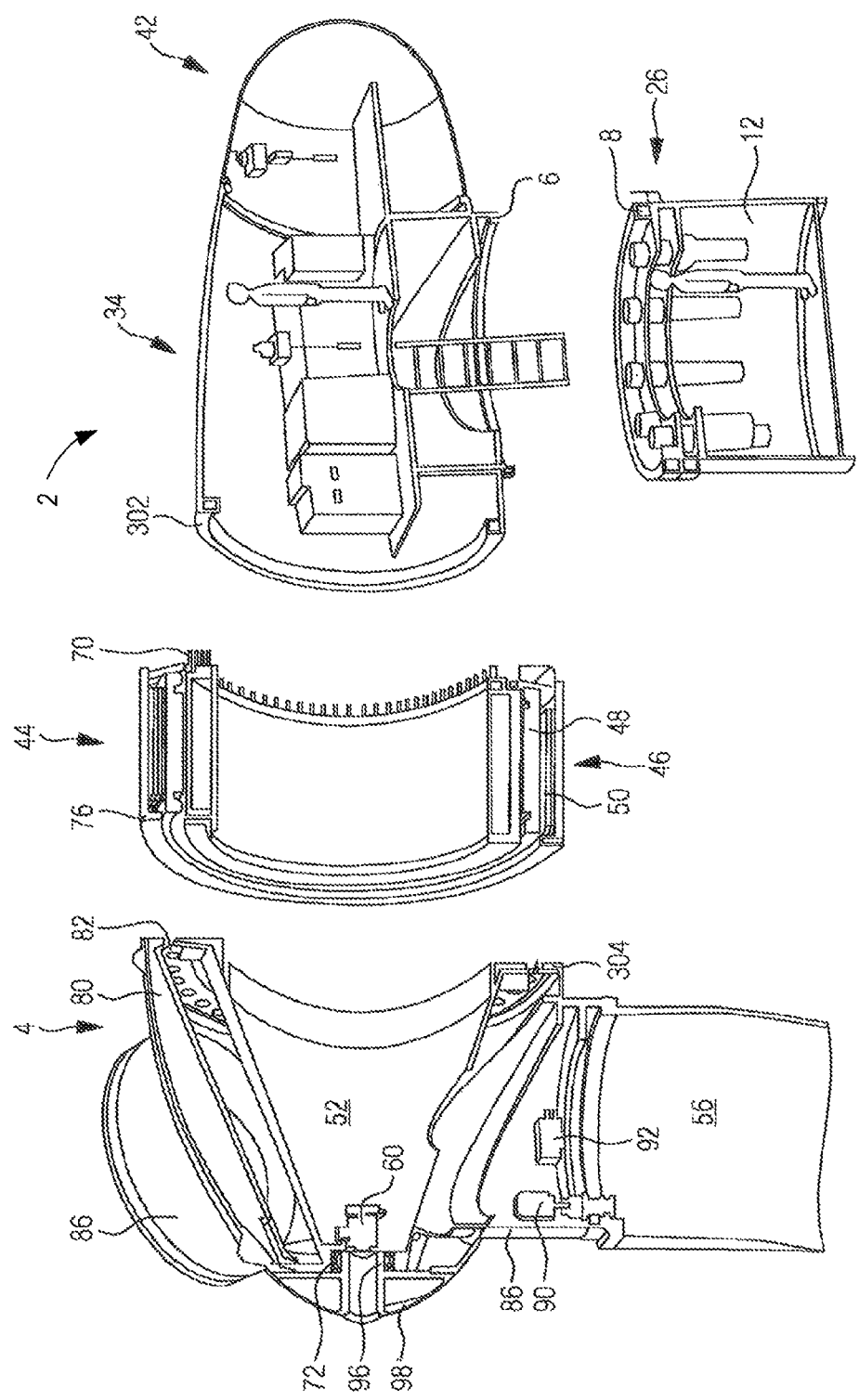
FIG. 3 shows a pod as in FIG. 2 but in part as an exploded view in accordance with the construction components when constructing a wind power installation.

FIG. 3 shows the composition of some pod parts and fitment of the pod 1 on the pylon 12. A method of erecting a wind power installation can in that respect be such that the belt region 34 of the stationary part 2, optionally together with the rear portion 42, is fitted onto the pylon 12 in the region of its pylon head 26. For that purpose the azimuth flange 6 of the stationary part 2 is fitted onto the pylon head 26 in the region of the azimuth bearing 8 and onto the azimuth bearing 8 respectively, and fixed there.

As the next essential step, the generator portion 44 together with the generator 46, namely the generator rotor member 50 and the stator 48, and together with the rear bearing 70 which for that purpose are pre-installed, as shown in FIG. 3, can be fixed in the belt region 34. For that purpose the rear bearing 70 is arranged on and fixed to an annular belt flange 302.

In a further essential step the front cone portion 52 of the stationary part, together with the hub portion 80 of the rotating part, can be mounted in place. For that purpose the front cone portion 52 is fixed to the generator portion 44 and the hub portion 80 is fixed to the rotor member portion 76. For that purpose each of those 4 portions has a corresponding ring flange. The hub portion 80 of the rotating part 4 can be pre-installed with the front cone portion 52 of the stationary part 2 together with the front bearing 72 before being lifted to the height of the pylon head. Auxiliary fixings can be provided for that purpose for example in the region of the brake disc 82 to fix the hub portion 80 and the front cone portion 52 relative to each other.

Depending on the respective size of the wind power installation and thus the size of the pod and depending on the respective available construction crane, that pre-installed hub portion 80 with the front cone portion 52 with or without rotor blades 56 or possibly with rotor blade portions can be lifted. Devices like the slip ring body 60, the pitch drives 90 and the pitch boxes 92 can be pre-installed in the hub portion 80 and/or the front cone portion 52. Some or all of those or further devices can be pre-installed.

Figure 4:
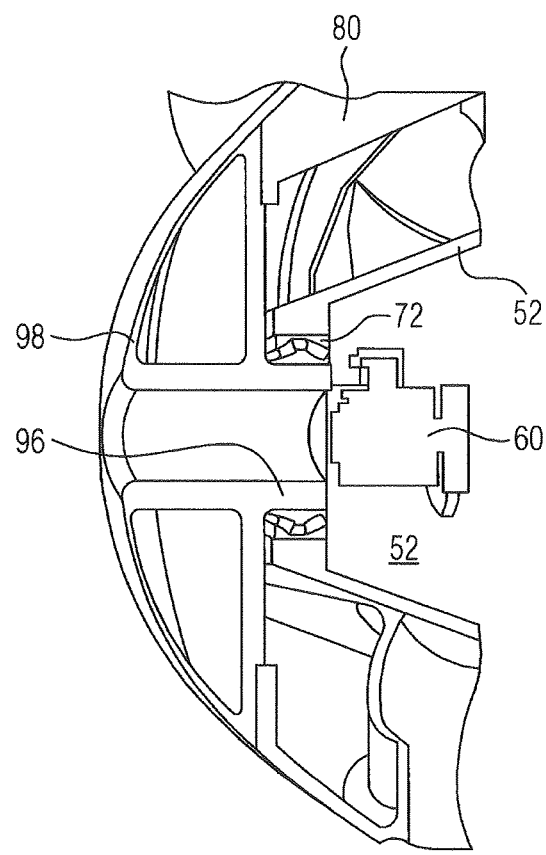
FIG. 4 shows a portion on an enlarged scale of a front part of the pod of FIG. 2.

FIG. 4 shows a portion of a front part of the hub portion 80 of the rotating part and the front cone portion 52 of the stationary part. It is possible to see here in particular the mounting for the front bearing 72 which here is in the form of a two-row tapered roller bearing. The hub portion 80 has a hub cap 98 which can also be referred to as the spinner cap 98 and which can be produced as a separate part in relation to the hub portion 80 and is then fixed to the hub portion 80. The hub cap 98 also includes the bearing support 96 which is mounted from the interior in the front bearing 72.

FIG. 4 also shows the slip ring body 60 diagrammatically and without illustrating the connected lines these are otherwise also not shown in the views for the sake of greater clarity of the drawing. The slip ring body 60 is easily accessible from the interior of the front cone portion which forms a stationary part, and can be removed for maintenance operations or repair operations.

When the slip ring body 60 is removed the front bearing 72 can be removed towards the interior of the front cone portion 52 and thus replaced. For that purpose the hub portion 80 and in particular the bearing support 96 would have to be fixed relative to the front cone portion 52.

Figure 5:
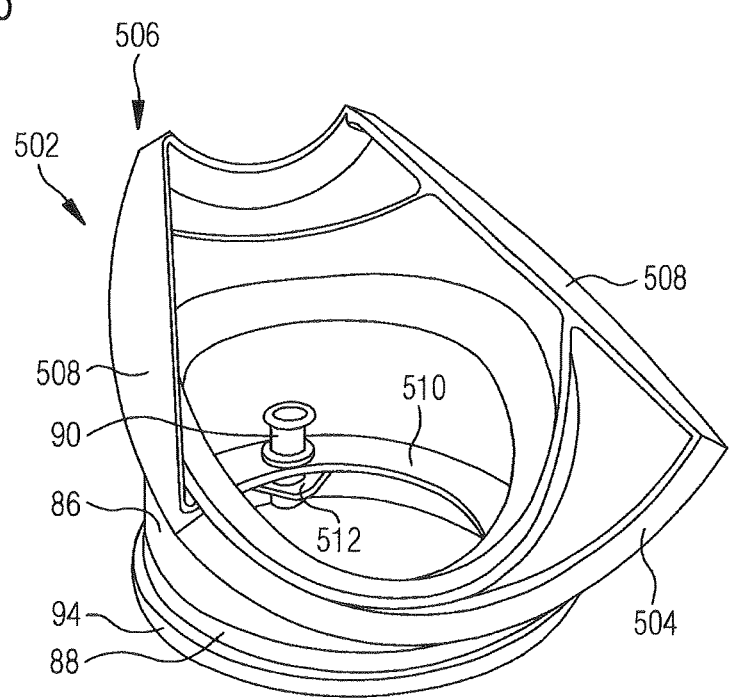
FIG. 5 shows a segment of a part of the pod shown in FIGS. 2 and 3, provided for fixing a rotor blade.

The hub portion 80 which is entirely or partially shown in FIGS. 2 to 4 can be composed, in an embodiment, of three basically identical hub segments 502. Such a hub segment 502 is shown in FIG. 5. For fixing to the rotor member casing portion 76, as is shown in FIGS. 2 and 3, the hub portion 80 has an annular hub flange 304. A cap flange 306 is provided for connection to the hub cap 98. The hub segment 502 which is clearly illustrated separately in FIG. 5 has a hub flange portion 504 and a cap flange portion 506. Also shown are two segment flanges 508 provided for connecting the hub segments 502 together. Thus three hub segments 502 can be connected to form the hub portion 80 by means of the segment flanges 508. In that case the hub flange portions 504 are overall fitted together to form the hub flange 304. The cap flange portions 506 are also fitted together to form the cap flange 306.

The hub segment 502 also has a rotor blade attachment 86 having a blade connection 88. A blade bearing 94 is fixed to the blade connection 88.

Provided in the rotor blade attachment 86 is a reinforcing rim portion 510 which extends peripherally in a ring shape and in which the pitch drive 90 is fitted. The pitch drive 90 is also held by a receiving projection 512. The pitch drive 90 can be arranged in stable relationship by virtue of that doubled fixing for same. Both the reinforcing rim portion 510 and also the receiving projection 512 are arranged in the rotor blade attachment 86 and thus in the hub portion 80. Pre-installation of the pitch drive 90 can be made possible or facilitated thereby.

Figure 6:
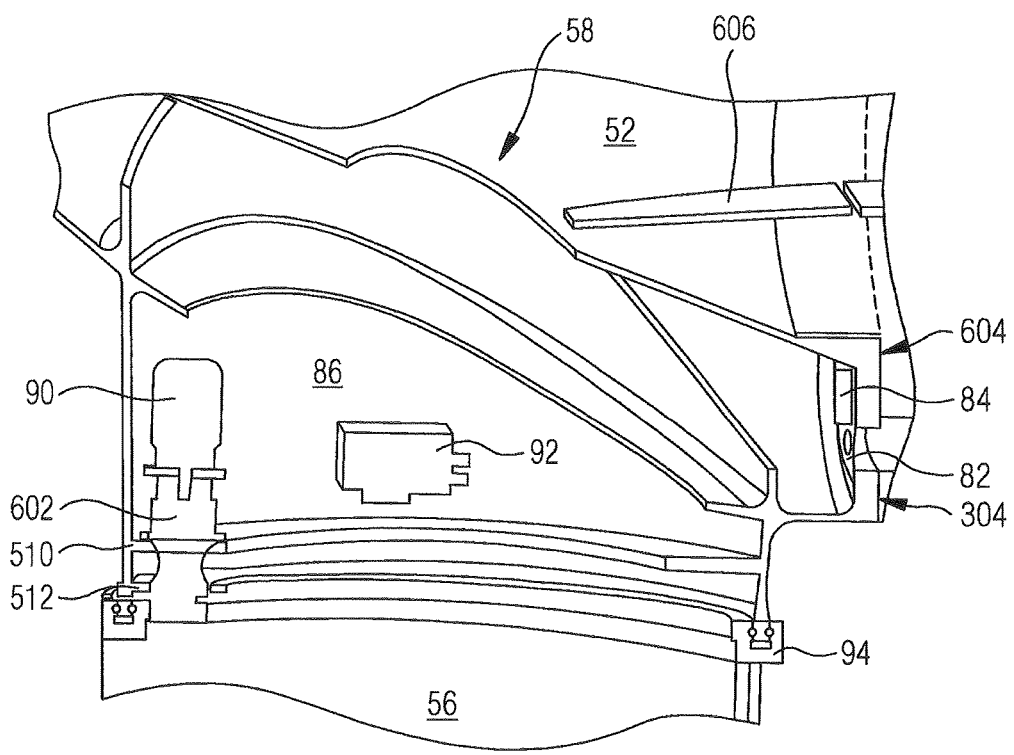
FIG. 6 shows a portion of a pod as shown in FIG. 2, namely a blade connection for fixing a rotor blade.

The enlarged view in FIG. 6 shows in particular a rotor blade attachment 86 in greater detail. The pitch drive 90 is fitted with a transmission portion 602 in the reinforcing rim portion 510 and the receiving projection 512, and in particular fixed to the reinforcing rim portion 510. The receiving projection 512 can in particular increase tilting stability for the pitch drive 90. In the event of a current failure the pitch drive 90 can be supplied with displacement energy by means of the pitch box 92 in order to turn the rotor blade 56 into the feathered position. Connecting lines are not shown in this view in FIG. 6 although they are naturally provided between the pitch drive 90 and the pitch box 92. The blade bearing 94 with which the rotor blade 56 is mounted rotatably to the rotor blade attachment 86 is in the form of a double ball bearing or two-row ball bearing.

FIG. 6 also shows the brake disc 82 with the brake means 84. The brake means 84, such as a caliper, is fixed to the front cone portion 52 in the region of an annular flange 604 which can also be referred to as an annular cone flange 604. The brake means 84 with brake disc 82 is provided for braking and arresting the rotor.

A front platform portion 606 can be arranged as part of the platform 38 in the cone portion 52, and fixed to the front cone portion 52. A service worker can pass through the maintenance opening 58 in the front cone portion 52 from the front platform portion 606 to and into the rotor blade attachment 86 and from there also to and into the rotor blade 56. For that purpose however the brake disc 82 is firstly to be fixed in the brake means 84 and an arresting action is also to be implemented to prevent rotation of the rotating part and thus a movement of the rotor blade attachment 86.

Figure 7:
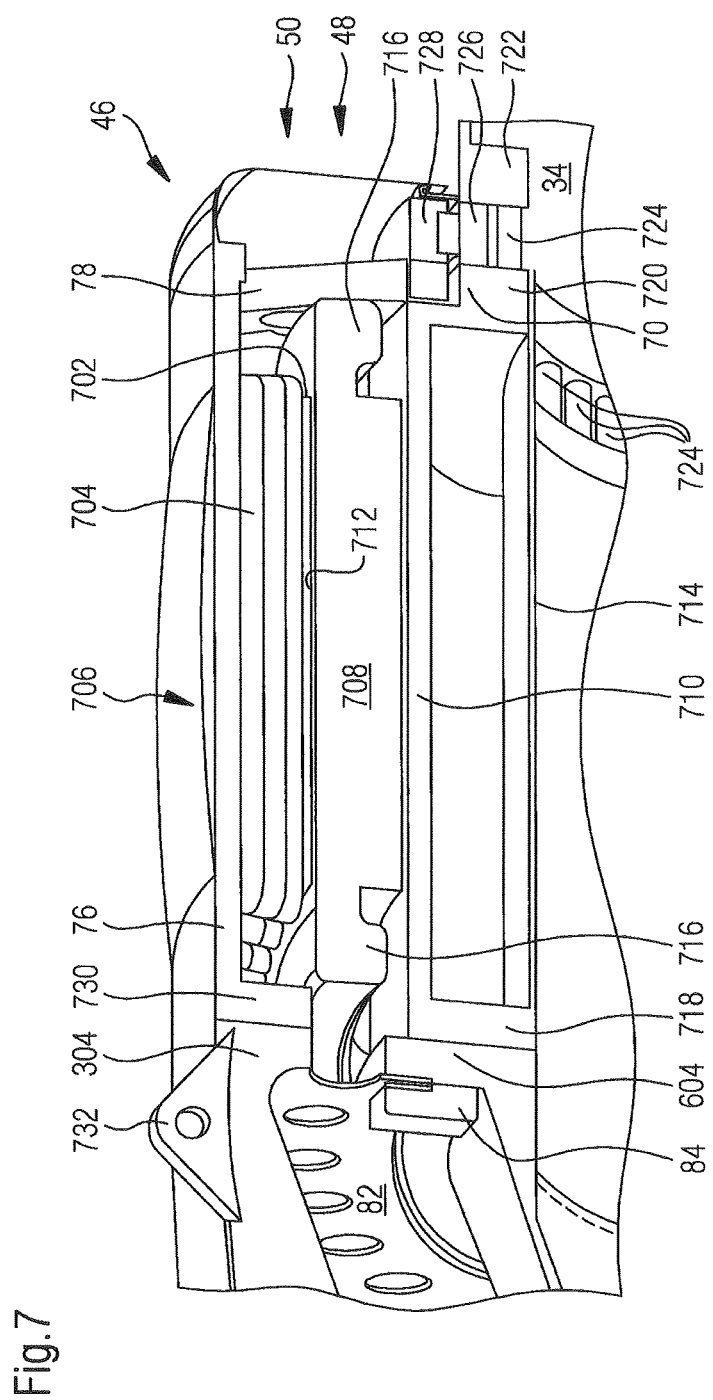
FIG. 7 shows a portion of the pod shown in FIGS. 2 and 3 in the region of a part of the generator accommodated in the pod.

FIG. 7 shows the structure and arrangement of the generator 46 in a portion thereof on an enlarged scale. The generator 46 has a stator 48 and a rotor member 50. The rotor member can also be referred as the generator rotor. The rotor 50 of the generator 46 is referred to as the rotor member 50, in order better to differentiate it from the aerodynamic rotor.

The rotor member 50 has various poles each having a respective pole shoe 702. The pole or pole shoe body, of which only the pole shoe 702 can be seen in FIG. 7, is provided with a pole shoe winding 704 which is overall supplied with a direct current for external excitation of the pole shoe body and thus the rotor member 50, which current moreover is to be supplied by way of the slip ring body 60 indicated in FIGS. 2 to 4. The rotor member 50, in particular its pole shoe body, is fixedly secured in the rotor member casing portion 76. External ribs 706 are provided to cool the rotor member 50. They can be mounted on the rotor member casing portion 76 or the rotor member casing portion 76 is produced together with those external ribs 706. Advantageously the rotor member casing portion 76, the external ribs 706 and also the pole shoe body of each pole of the rotor member 50 is respectively made from metal or at least another material which has good thermal conductivity. In that way the heat of the rotor member 50 can be passed into the rotor member casing portion 76 and dissipated outwardly by way of the external ribs 706. The external ribs 706 are arranged approximately lengthwise relative to the wind, in particular when the pod 1 is oriented in relation to the wind, so that the wind can flow along the external ribs 706 and provide a suitable cooling effect. Alternatively the external ribs can also be arranged in a helical configuration around the rotor member 50 in order better to correspond to the wind is deflected by the rotor blades.

The stator 48 substantially has a laminated stator core 708 fixedly secured to a stator carrier portion 710. The laminated stator core 708 is provided with windings, in particular with a continuous winding and in particular with a 6-phase, namely twice 3-phase continuous winding, which however is not shown in FIG. 7 for the sake of clarity. Stator windings are only diagrammatically indicated by the illustrated winding heads 716. The generator air gap 712 is formed between the pole shoes 702 and the laminated stator core 708. The stator 48 extends radially inwardly from the air gap 712 and due to the proposed structure there is no spatial limitation worth mentioning in that direction. That affords good accessibility and in that case the space can be used for example for cooling devices, depending on what kind of cooling requirement is involved. In addition the space can possibly be used to increase the stability of the stator 48.

The illustrated configuration of the rotor member 50 and the stator 48 basically reproduces a characteristic size requirement for the rotor member and stator. It will be seen that the radial extent of the rotor member 50, namely from the air gap 712 to and including the rotor member casing portion 76, is markedly less than the radial extent of the stator 48 from the air gap 712 to a cover plate 714 of the stator 48. Thus, with a given maximum outside diameter which can be predetermined for example due to transport conditions, the illustrated configuration in the form of an external rotor member makes it possible for the air gap 712 to be of a larger diameter than if the stator which is of a larger radial thickness, having regard to the outside diameter thereof, were disposed on the outside.

The stator carrier portion 710 is fixed to the cone flange 604 by means of a front stator flange 718 or the cone flange 604 is fixed to the front stator flange 718. Towards the belt region 34 of the stationary part 2 the stator carrier portion 710 has a rear stator flange 720 with which the stator carrier portion 710 is fixed to a front belt region flange 722. A plurality of connecting bolts 724 are provided for that purpose. The rear bearing 70 with the stationary bearing portion 726 is accommodated between the two flanges, namely the rear stator flange 720 and the front belt region flange 722. The rear bearing 70 can basically be removed by separation of the rear stator flange 720 from the belt region flange 722.

The rotor member casing portion 76 is fixedly connected on the rotating bearing portion 728 of the rear bearing 70 by way of the annular grid-like carrier structure 78. The rotor member casing portion 76 is also connected to the hub flange 304 by way of the rotor member casing flange 730. Lifting eyes 732 are also provided for lifting purposes. Such lifting eyes 732 can basically be arranged on each hub segment 502. It may however be sufficient to provide only a pair of lifting eyes 732 so that a pair of lifting eyes 732 is only arranged on a hub segment 502. For that reason the hub segment 502 in FIG. 5 does not have any lifting eye 732.

Figure 8:
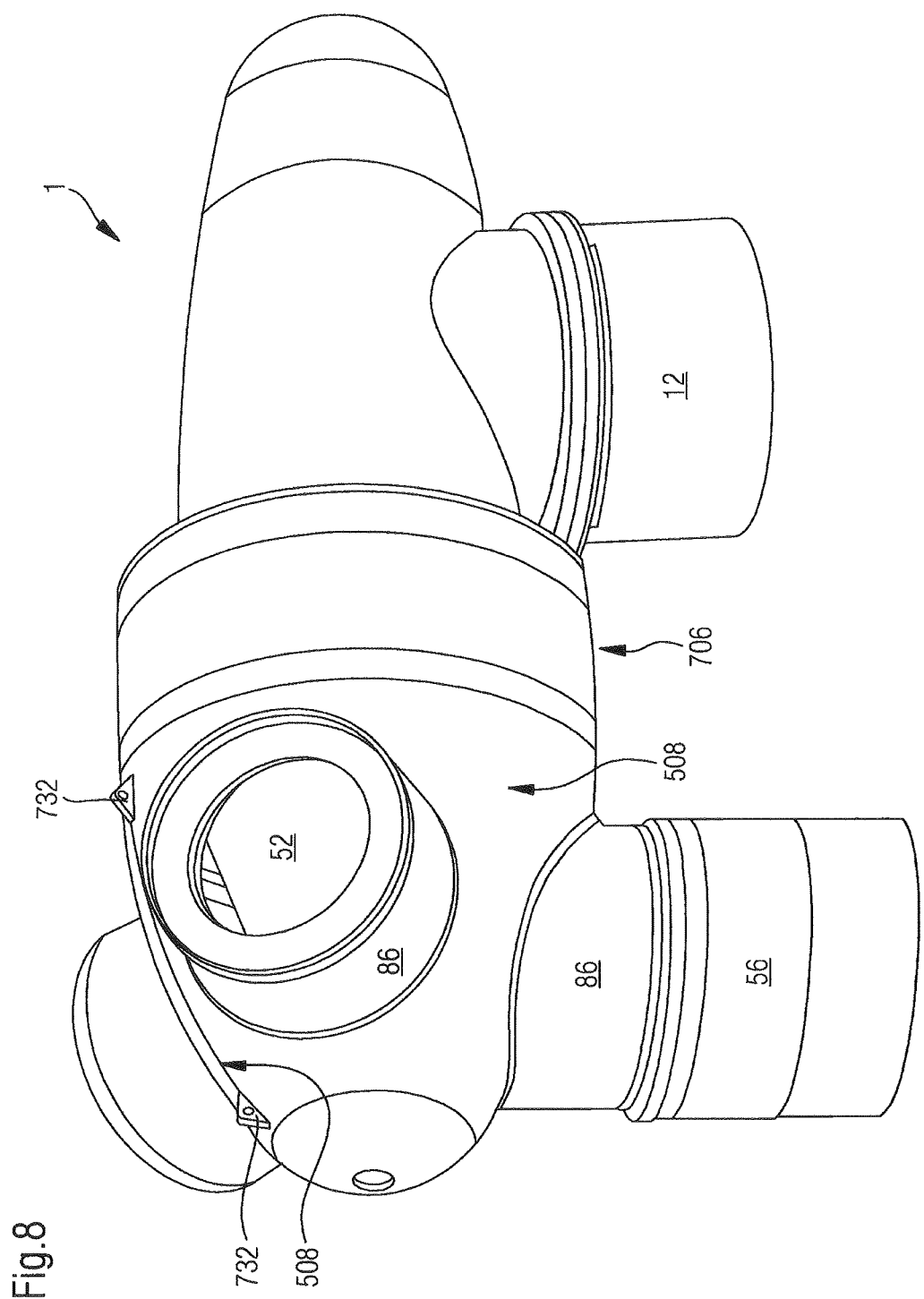
FIG. 8 shows a perspective external view of a pod, FIG. 9 corresponds to the view in FIG. 2, additionally diagrammatically showing a machine carrier in accordance with the state of the art, for explaining a difference in relation to an earlier solution, FIG. 10 diagrammatically shows a lateral sectional view of a pod according to the invention of a further embodiment, FIG. 11 diagrammatically shows a lateral sectional view of a pod according to the invention of a further embodiment.

FIG. 8 shows an external view of the pod 1 in the assembled condition of being fitted on a pylon 12. A rotor blade 56 is diagrammatically shown as being fitted at a rotor blade attachment 86 for clearer illustration purposes. In particular seams in the region of each two assembled segment flanges 508 can be seen in this external view. In the region of such seams it is possible to see two lifting eyes 732 which are provided for mounting the pod 1, more specifically this hub portion. It is to be noted that, depending on the respective size, the hub portion 80 can also be supplied in one piece. In that way it is also possible that it is only then that lifting eyes 732 are fitted in the region of such a weld seam, in relation to the segment flanges 508.

The external ribs 706 can preferably be so thin and provided in such large numbers that they cannot be perceived as ribs in the size and resolution of the view in FIG. 8. The front cone portion 52 is to be seen from the exterior, through an opening in a rotor blade attachment 86.

Figure 9:
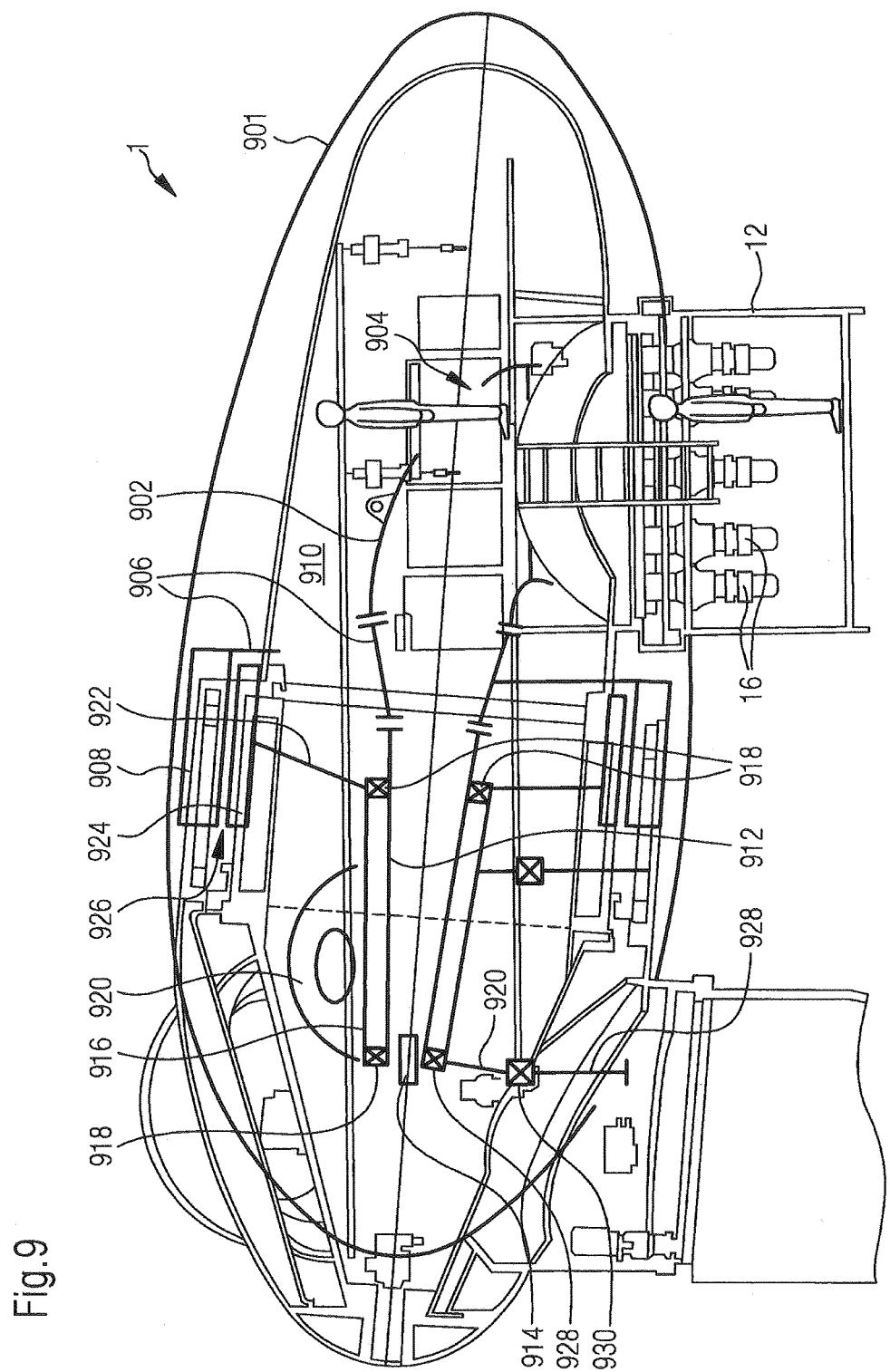

FIG. 9 substantially corresponds to the view in FIG. 2, but the FIG. 9 view is not perspective or differs in its perspective slightly from the view in FIG. 2. FIG. 9 diagrammatically shows a pod 901 of a known wind power installation of smaller size, in particular a lower power output class. The known pod 901 is also a pod of a gearless wind power installation. Coming from the pylon 12, such a pod in the state of the art firstly has a cast machine carrier 902. It extends similarly to a curved tube from the pylon 12 in an approximately 90° bend to the generator. To gain access to the pod 901 on foot the service personnel must thus climb upwardly from the pylon 12 into the machine carrier 902 and leave the machine carrier 902 from a rear machine carrier opening 904, into a free internal space in the pod. Adjoining the machine carrier 902 is the stator carrier 906 which can also be referred to as the stator bell because it basically passes completely through the pod 901 and is of an approximately bell-shape configuration. Fixed at its periphery is the stator 908 which here is shown in only highly diagrammatic form. To pass into the front part of the pod 901, a stator bell opening 910 is provided in the stator bell 906. A shaft journal 912 extends from the stator bell 906. The shaft journal is internally hollow and cables can be carried therein to a slip ring body 914. It is however not possible for a person to pass into the front region of the pod 901 through the shaft journal 912.

The rotor, namely both the aerodynamic rotor and also the rotor member of the generator, is carried on that shaft journal 912. Provided for that purpose is a rotor hub 916 mounted rotatably on the shaft journal by way of two shaft journal bearings 918. Disposed on the hub 916 are rotor blade attachments 920 for fixing rotor blades. Also arranged on the hub is a rotor member carrier 922 which extends from there radially outwardly and carries the generator rotor member 924 within the stator 908. The air gap 926 is formed between the stator 908 and the generator rotor member 924.

Shown in the rotor blade attachment 920 which is downward in the view is a rotor blade adaptor 928 connected rotatably to the rotor blade attachment 920 by way of adaptor bearings 930. A rotor blade is not shown here.

The mode of operation here is such that wind forces are transmitted to the rotor blades and from there to the rotor blade adaptors 928 in order thereby to perform a rotary movement. The forces are then further transmitted to the hub 916 by way of the adaptor bearings 930 and the rotor blade attachments 920. The hub 916 is of a comparatively small diameter and further transmits the torque generated as described to the rotor member carrier 922, from which the torque is transmitted outwardly to the rotor member 924. Accordingly, this involves a comparatively disadvantageous flow of force from the rotor blades to the generator rotor member. In addition the shaft journal 912 which has to carry forces due to the weight of the rotor and in addition tilting moments of the rotor is precisely smaller in its diameter than in the case of the concept according to one or more embodiments of the invention, using a pod carrier. Accordingly such shaft journals are produced as a very massive structure, more specifically with very great wall thicknesses. Accordingly this involves a greater weight to ensure adequate stability.

In addition, although the pod 901 is in part of a larger diameter than the pod 1, it is more difficult to gain access to the pod 901 on foot because the stator carrier 902 is arranged in the middle of the pod 901 and thus basically occupies the best position. All items of equipment have to be arranged there around that machine carrier 902.

In addition accessibility to the pod 901 on foot is only afforded in a part because the stator bell 906 makes a large part of the pod 901 inaccessible or accessibility is possible only when the rotor is fixed and thus the generator rotor member 924 is fixed.

In comparison there is proposed a pod 1 which is self-supporting and thereby firstly avoids, namely replaces, the machine carrier 902. In that case the pod 1 carries the supporting forces in its outer skin which is of a considerably larger diameter in relation to the previous structure and can thus achieve a high level of stability with a markedly smaller wall thickness. In spite of the large diameter therefore it is even possible to make weight savings—depending on the respective specific configuration—in comparison with the previous structure described with reference to FIG. 9.

Figure 10:
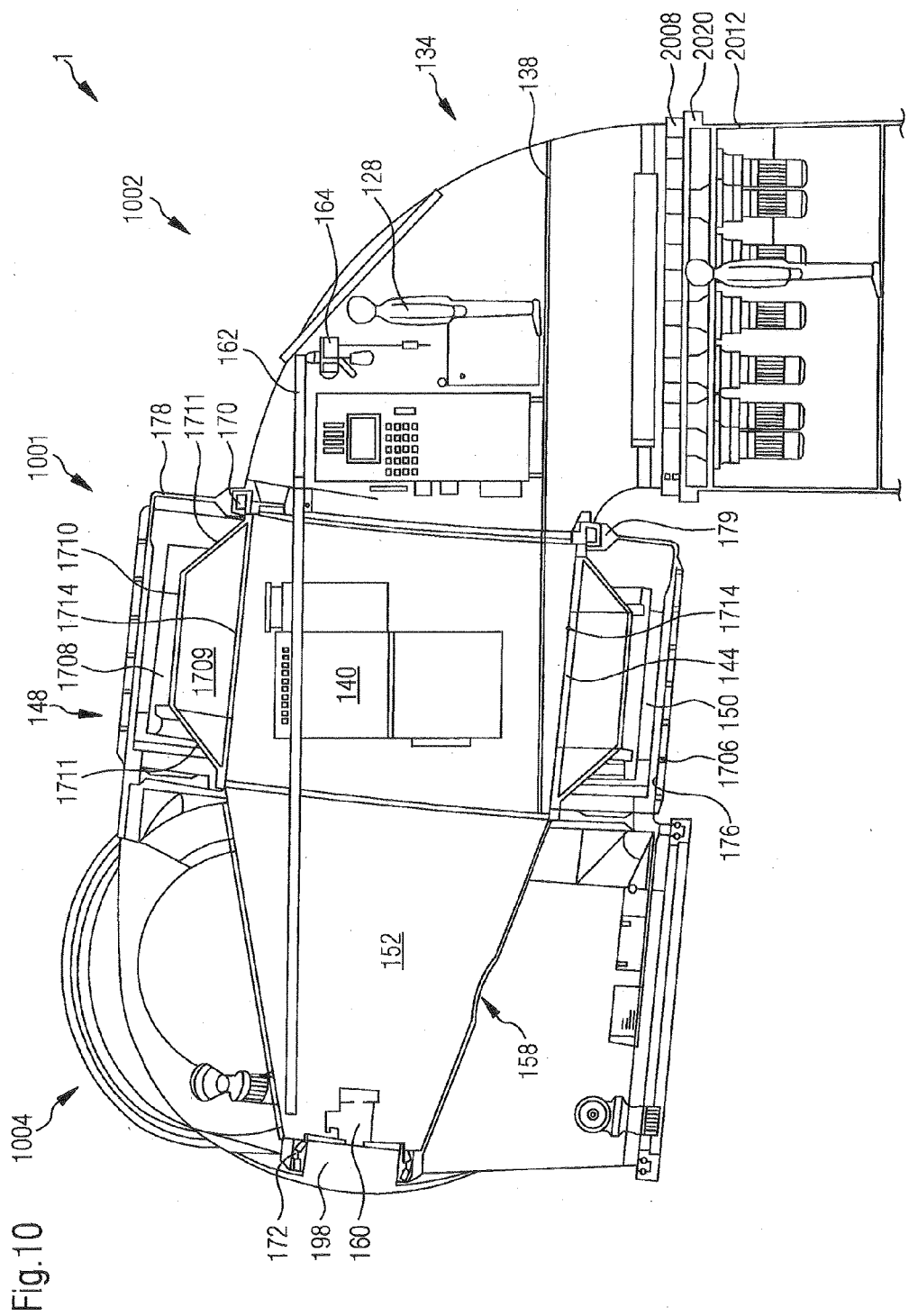

The pod configuration in FIG. 10 has a pod curve region 134 which functionally approximately corresponds to the belt region 34 in FIG. 2. The pod curve region 134 is thus part of the stationary part 1002 of the pod 1001. Adjoining the pod curve region 134 is a generator portion 144 and adjoining same is a front cone portion 152. In that case the pod curve region 134 is connected to the pylon 1012 by way of an azimuth bearing 1008 and a pylon flange 1010. In that way the pod curve region 134 forms a stable connection from the pylon 1012 to the generator portion 144. For that purpose the pod curve region is formed substantially like a tube portion curved through about 90°. That makes it possible to achieve a very good stable and rigid connection between the pylon 1012 and the generator portion 144. It was found that a rear portion 42, as shown for example in FIG. 2, is not necessarily required. The configuration of that tubular element ultimately also ensures deflection of the flow of forces from the generator rotor member to the pylon in a simple and efficient manner. The fundamental structure which provides a load-bearing outer shell and which accordingly affords a great deal of space in the interior of the pod 1001 means that it is also possible to dispense with the space which in the FIG. 2 embodiment is present in the rear portion 42.

The pod 1001 in FIG. 10 can be modified in a variant in such a way that in particular a casing portion which is not load-bearing can be fitted at the rear, at the side remote from the rotor. For example additional assemblies such as cooling means or devices for service operations such as for example crane openings can be arranged downwardly therein.

The person 128 shown in the pod curve region 134 is standing on a platform 138 and shows that this embodiment in FIG. 10 also has a great deal of space in the pod 1001.

The platform 138 is correspondingly shortened in relation to FIG. 2. The crane rail 162 is also shortened and carries a winch 164 with which elements can be lifted out of the pylon 1012 into the pod 1001 or can be lowered therefrom. From there, mainly where the person 128 is shown on the platform 138, the winch 164 can be displaced with or without a load along the crane rail 162 to a position entirely forwardly into the front cone portion 152. It is possible in that way to reach the illustrated slip ring body 160 and also a maintenance opening 158 in the front cone portion 152.

The front cone portion 152 is fixedly connected by way of the generator portion 144 to the pod curve region 134 and by way thereof finally to the pylon 1012.

The generator portion 144 has a cylindrical casing portion 1714 which substantially forms a direct connection from the pod curve region 134 to the front cone portion 152 and by virtue of the nature of its configuration, in particular the cylindrical shape, also permits good transmission of force from the front cone portion 152 to the pod curve region 134. In particular forces are transmitted thereby, which are transmitted from the aerodynamic rotor to the hub cap 198 and further to the front bearing 172 and thereby to the front cone portion 152.

A stator carrier portion 1710 is arranged around the cylindrical portion 1714 and together with carrier sides 1711 and the cylindrical portion 1714 forms a structure which is approximately trapezoidal in section. The stator 148 and in particular the laminated stator core 1708 is carried thereby. Cooling flows for cooling the stator 148, in particular the laminated stator core 1708, can be guided within the trapezoidal structure 1709.

As there is also sufficient space within the generator portion 144 and as that generator portion 144 can also be entered on foot in operation of the wind power installation items of equipment such as control cabinets 140 or the like are also disposed there.

The embodiment of FIG. 10 has, on the rotating part 1004, a rotor member casing portion 176 which carries the rotor member 150 and is provided with external ribs 1706. The external ribs 1706 are arranged approximately in a helical form around the pod 1001, in particular namely around the rotor member casing portion 176. Wind deflected by the aerodynamic rotor in operation can thus advantageously flow to those external ribs 1706, more specifically with an air flow flowing approximately parallel to the ribs 1706. That kind of configuration of the external ribs 1706 is not restricted to the illustrated embodiment in FIG. 10. Rather, such external ribs are generally a preferred design configuration.

The rotor member casing portion 176 is mounted on the rear bearing 170 by way of an annular carrier structure 178 which at the same time functions as a cover apron. A connecting carrier portion 179 extends approximately over an outside periphery of the rear bearing 170. Thus the forces acting on the rotating part 1004 are transmitted to the rear bearing 170 by way of the annular carrier structure 178 and the connecting portion 179. In addition that annular carrier structure 178 at any event encloses the generator 146 from the one side.

The illustrated configuration in FIG. 10 can differ in further details from the embodiment as shown for example from FIG. 2. Unless otherwise described further elements of this FIG. 10 embodiment correspond at least basically to the embodiment of FIG. 2. In addition the novel structure as shown for example in FIG. 2 or the other Figures promotes a substantially more advantageous flow of forces from the rotor blades to the rotor member because the flow of forces is substantially already received in the region of the outer skin or outer walls of the hub portion 80 and is passed from there to the outwardly disposed rotor member 50. At any event the newly proposed pod 1, in spite of the partially reduced overall diameter, affords substantially more space in its interior because basically the entire interior is available for the provision of various items of equipment and also for the provision of a working platform or a walkway surface for negotiating the pod on foot.

In addition the newly proposed pod structure promotes the provision of a generator in the form of an external rotor member which in turn can lead to a larger air gap diameter with an unchanged overall outside diameter because the radial extent of the rotor member is less than that of the stator.

Providing the rotor with cooling ribs a so-called exterior rib configuration, can provide for example a cooling surface area in the region of about 20-150 square meters for an outside diameter of 5 m. The rear bearing 70 can be in the form of a rolling bearing and in that case can be replaceable.

The belt region 34 of the stationary part 2, which can also be referred as the pod carrier 34, is preferably in the form of a casting. The rear portion 42 can also be referred to as the tail casing 42 and is preferably made from aluminum. A so-called azimuth module can be arranged in the pylon head 26 for azimuth adjustment, for which uniformly arranged drives are proposed, distributed in particular uniformly over the periphery. The azimuth bearing 8 can be of an internally toothed configuration in particular at its inner bearing ring 22. A smaller tooth arrangement diameter, in comparison with externally toothed structures, can be compensated by a larger number of drives. In an embodiment, 14 azimuth drives 16 are provided here.

For making the rotatable connection between the front cone portion 52 and the bearing support 96, there can be a two-row tapered roller bearing as the front bearing 72 which is replaceable from the interior.

The slip ring body can be accommodated in the front cone portion 52 or on the bearing support 96. The bearing support 96 is part of the hub cap 98 which is also preferably intended for integration of the three hub segments 502.

The proposed self-supporting pod makes it possible to address disadvantages like high weight and a high level of mounting complication and expenditure. Accordingly it is possible to achieve a reduction in weight and a reduction in mounting complication and expenditure. Further advantages and proposed aspects are as follows:

The air gap lies in the natural flow of forces. The outwardly disposed carrier structure provides for achieving a low stress level. In that respect it is to be noted in particular that the stress level is proportional to the inverse of the square of the radius of the carrier structure relative to a pod center line. In that respect the stability of such a carrier structure basically increases only proportionally to the respective wall thickness of the carrier structure.

The use of the rear bearing 70 in the proximity of the air gap makes it possible to achieve a high level of air gap stiffness. In addition the air gap, viewed in the axial direction, is between the rear bearing 70 and the front bearing 72. That also makes it possible to achieve a high level of tilting stability and a correspondingly small air gap thickness. An increase in the length of the air gap can also be promoted. All this ultimately leads to small air gap losses.

The proposed external rotor member generator means that the rotor member can be cooled from the outside, which initially can be purely passively possible.

The stator can be better cooled through the freely accessible stator core center. In the proposed solution the stator can be reached from the interior. There are substantially no limitations in respect of height and thickness in the laminated stator core. That gives a great deal of space for cooling and the core stiffness of the laminated stator core can also be increased.

The pod can also be of a spacious configuration in its interior, while being of small outside dimensions.

In addition a self-supporting pod has a robust outside structure which facilitates in particular transport and construction.

The construction of a wind power installation on site can be simplified by virtue of the robust outside structure and in addition lifting eyes which are cast thereon, like the lifting eyes 732. Operations for fitting small parts on the building site become superfluous in that case. Basically a simple component exchange is possible, in particular in regard to the rear bearing 70 and the front bearing 72. Any rescue of people from the pod 1 can also be handled with fewer problems.

The proposed pod also affords a high level of sealing integrity. That is achieved for example by the connection of the rotor blade externally to the rotor blade attachment 86 of the hub portion 80 because no additional casing arrangement is provided, which could allow moisture to enter at the edges of the attachment 86. Sealing integrity can also be improved in the region of the azimuth bearing, that is to say the connection to the pylon head.

For supplying feed air, it is proposed that water separators and/or sand separators are used.

The proposed pod is also advantageous for larger installations, more specifically in particular for future installations involving a structural size and power output level which exceeds the present structural size or power output level. A limitation is imposed in particular by limitations in terms of on-road transport of the components. The pod carrier and/or hub portion are possibly to be appropriately divided for transport. Because the pod is self-supporting and thus the pod casing forms the load-bearing structure the pod can correspondingly grow in size for installations as they become larger, that is to say in relation to larger installations the pod can be made correspondingly larger, thereby directly affording an increase in stability.

The flow of forces in respect of the proposed pod is also advantageous in such a way that, coming from the rotor blades from the outside, the forces are passed through the hub portion 80 directly to the rotor member 50 and then further to the stator and from there to the outer shell of the stationary part 2 in a basically straight simple direction.

A rolling bearing with a raceway track diameter of about 3 m is possible for the rear bearing 70, which permits a high level of stability, in particular resistance to tilting.

Figure 11:
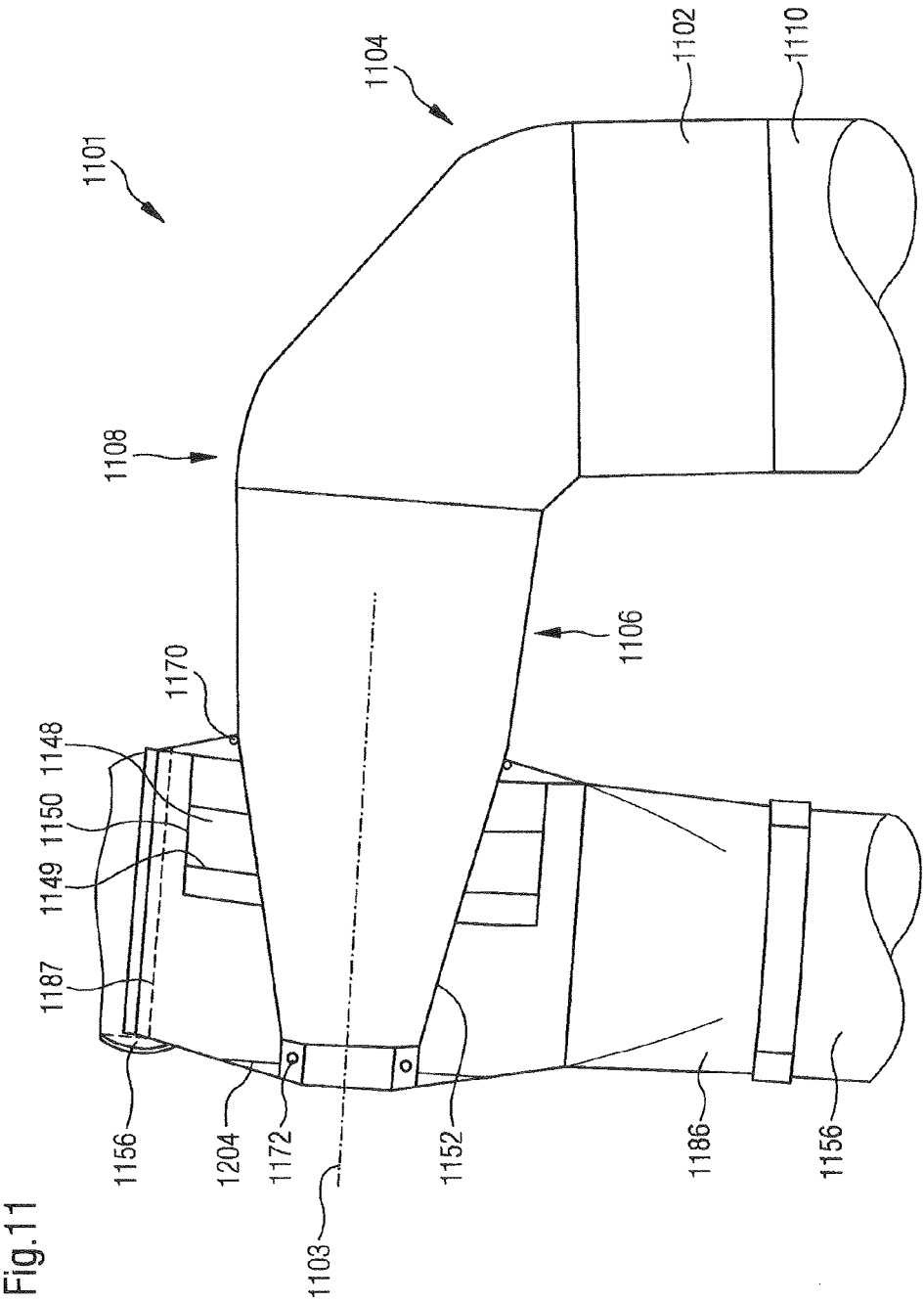

The pod 1001 in FIG. 11 has substantially a tubular body which is angled or curved through about 90°. That arrangement has a pylon connection region 1102, a connecting portion 1104 and a shaft journal portion 1106. The connecting portion 1104 is connected to or joined to the shaft journal portion 1106 by way of an approximately annular shaft journal connecting region 1108. The connecting portion 1104 is connected to the pylon head 1110 and thus a corresponding pylon, by way of the pylon connecting region 1102.

The shaft journal portion 1106 has a front cone portion 1152 having a stator 1148. Of the stator 1148, the Figure shows a stator structure 1149 which substantially carries an electromagnetically operative part (not shown in FIG. 11) of the stator 1148, more specifically in particular the laminated stator core members and the stator windings. At any event the stator structure 1149 together with the shaft journal portion 1106, in particular the front cone portion 1152, can be formed in one piece and thus integrated into that shaft journal portion. By virtue of its function, the front cone portion 1152 can also be referred to as the shaft journal and in that respect then the stator 1148, at least its stator structure 1149, would then be integrated into the shaft journal.

The rotating part 1204 of the pod 1101 is supported by means of two bearings, namely a rear bearing 1170 and a front bearing 1172 rotatably on the front cone portion 1152 and thus rotatably on the shaft journal portion 1106. Rotor blades 1156 are thus mounted rotatably about an axis of rotation 1103. In that case each rotor blade 1156 is connected to a respective blade connection 1187 on the rotating part 1204, that is to say fixedly connected thereto, by way of a rotor blade attachment 1186 or rotor blade adaptor 1186. The rotor member 1150 of the generator which here is composed of the stator 1148 and the rotor member 1150 is also arranged in the region of that blade connection 1187.

In relation to the axis of rotation 1103 therefore the generator comprising the stator 1148 and the rotor member 1150 is arranged in the axial direction in the same region as the blade connections 1187. The three blade connections 1187 define a blade connecting region. In addition the generator comprising stator 1148 and rotor member 1150 is here disposed in the radial direction, relative to the axis of rotation 1103, within the blade connections 1187. In operation of the wind power installation therefore the blade connections 1187 rotate externally around the generator comprising stator 1148 and rotor member 1150. In that case the rotor member 1150 rotates with the blade connections 1187. In the illustrated embodiment therefore the generator is disposed both in the axial direction and in the radial direction within the blade connecting region defined by the blade connections 1187.

In addition the generator is within the rotating part 1204 which thus also forms a blade connecting cover and encloses the generator therein and protects it outwardly from the influences of weather.

Particularly when the generator is of a very long structural shape and is of a greater axial length than the blade connecting region the generator can also extend in the axial direction to at least one side beyond the blade connecting region.

FIG. 12 shows a perspective view inclinedly from the front of the pod 1101 of FIG. 11. FIG. 12 shows in particular parts of the rotor blades 1156. The rotor blades 1156 are respectively connected to the rotating part 1204 of the pod 1101 by way of the rotor blade attachment or adapter 1186. It will be seen that the blade connecting portion 1204 completely encloses the generator.

The blade connection 1187 can be seen in FIG. 12 in the form of an approximately V-shaped region at which the rotor blade attachment or adapter 1186 is fixed to the rotating part. Two auxiliary broken lines 1188 are shown by way of example for one of the two blade connections 1187 to clearly illustrate the V-shaped configuration. That kind of connection can improve a flow of forces from the respective rotor blade 1156 to the rotating part 1204, at any event in comparison with a connection which is straight instead of V-shaped. In addition the outside dimensions of the rotating part 1204 can be at least somewhat reduced, which is of significance in particular in the case of separate transport of the rotating part 1204 to the place of erection of the wind power installation.

In particular the described V-shaped form of the blade connection, that is to say the connection of the rotor blade attachment or adapter 1186 to the rotating part 1204 in a V-shaped region is a preferred embodiment which is not limited to the specific example shown in FIGS. 11 and 12, but applies generally.

FIGS. 13*a* to 13*d* show four different embodiments of a pod curve region 1334*a* to 1334*d*. Those pod curve regions substantially correspond to the pod curve region 134 shown in FIG. 10. The pod curve region 1334*a* in FIG. 13*a* has an outside curve region 1335*a* which extends approximately uniformly in a curved shape from a pylon connecting region 1308*a* to a generator connecting region 1310*a*. In this case the outside curve region 1335*a* is of a closed configuration and the pod curve region 1334*a* is basically in the shape of a tube portion curved uniformly through about 90°.

Figure 13B:
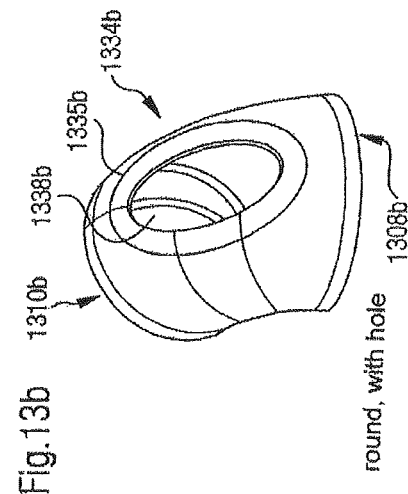
FIGS. 13a to 13d show various embodiments of a pod curve region of the pod, FIG. 14 compares a previously known pod to a pod according to an embodiment of the invention of the same power class, to illustrate the space availability provided.

The pod curve region 1334*b* in FIG. 13*b* is basically of the same shape as the pod curve region 1334*a*. In this case the pod curve region 1334*b* in FIG. 13*b* has an outside curve region 1335*b* with an exit opening 1338*b* to climb out. That exit opening 1338*b* permits service personnel to climb out of the pod, namely the pod curve region 1334*b*. FIG. 13*b* and moreover FIGS. 13*a*, 13*c* and 13*d* each show a still unequipped pod curve region and thus no door or the like is also shown in the exit opening 1338*b* in FIG. 13*b*. The pod curve regions shown in FIGS. 13*a* to 13*d* can be produced for example in the form of castings.

FIGS. 13*a* to 13*d* show different embodiments of the pod curve region 1334*a* to 1334*d*. The references in those four embodiments are identical in terms of the numbers, but differ in terms of the appended letters a to d, corresponding to the drawings in FIGS. 13*a* to 13*d*.

Figure 13D:
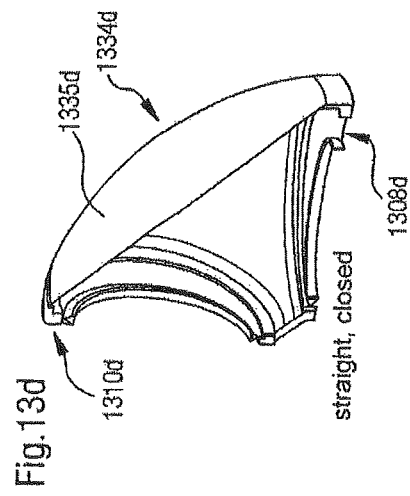
Figure 13A:
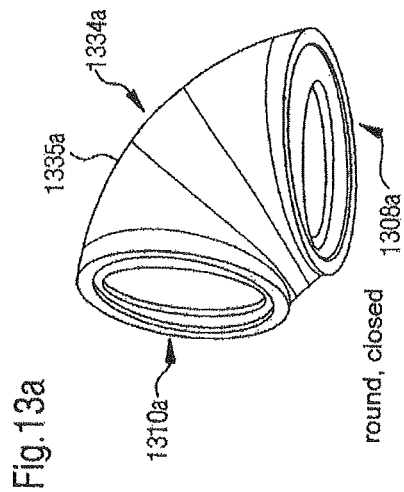
Figure 13C:
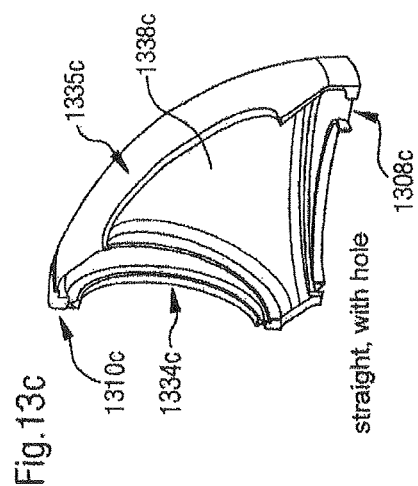

The embodiment in FIG. 13*c* has a pod curve region 1334*c* with a substantially straight outside curve region 1335*c* which in that respect can also be referred to as the back region 1335*c*. An exit opening 1338*c* is also provided in that outside curve region or back region 1335*c*.

The embodiment of FIG. 13*d* shows the pod curve region 1334*d* with a substantially straight outside curve region or back region 1335*d*, but without an exit opening.

It is possible to easily climb out of the pod through the exit openings 1338*b* and 1338*c* respectively. On the other hand the embodiments of FIGS. 13*a* and 13*d* without an exit opening can achieve a higher level of stability or the same stability in a simpler fashion. Any exit required for climbing out would then have to be provided at another location.

Figure 14:
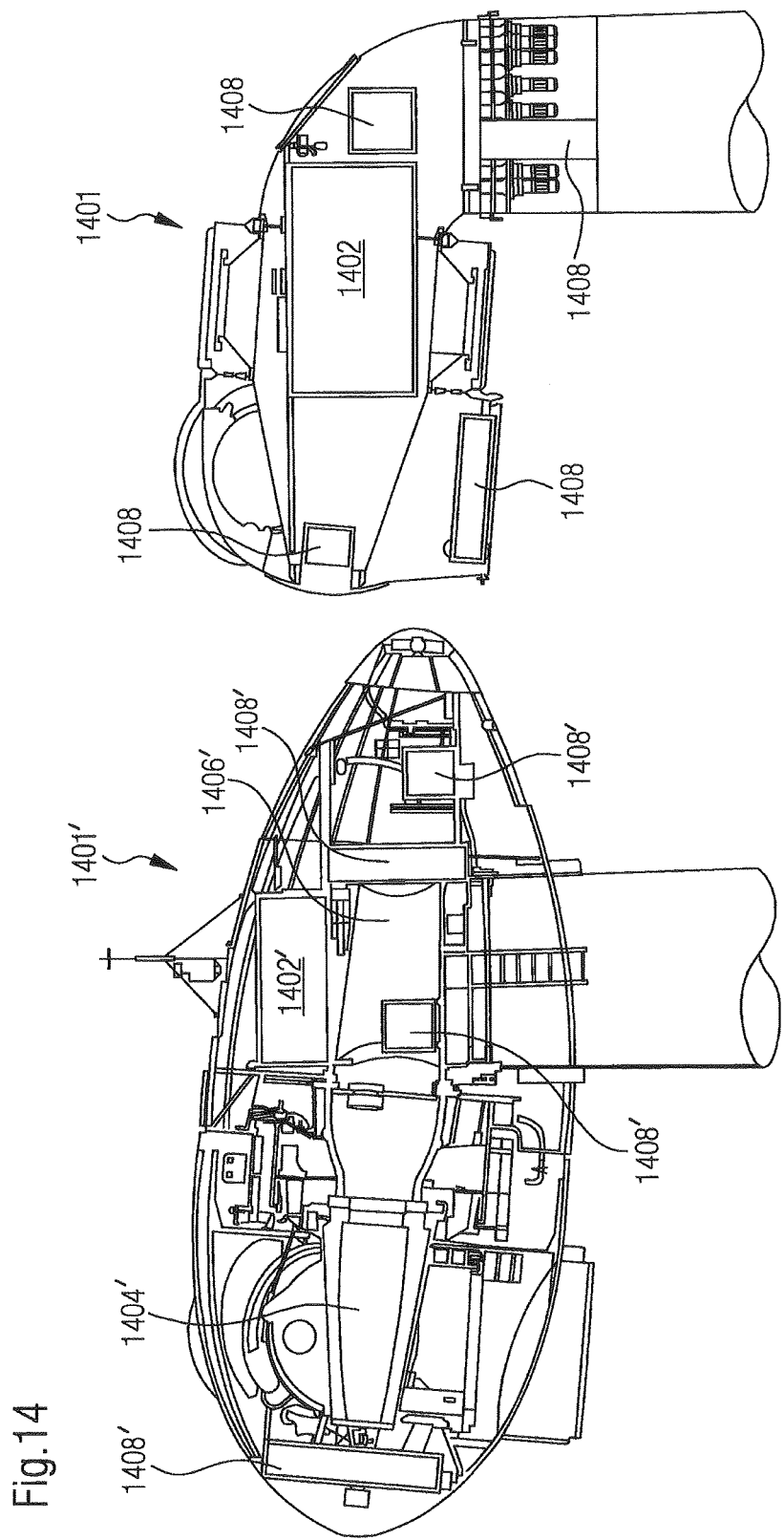

FIG. 14 shows a diagrammatic side view in section of a pod 1401 in accordance with an embodiment of the invention and a pod 1401' in accordance with the state of the art, wherein both pods 1401 and 1401' are part of a wind power installation of the same power class. FIG. 14 is intended to show the amount of spaces available. In particular the pod 1401 has a very large interconnecting working space region 1402. For that purpose a corresponding rectangle is shown in the pod 1401, which illustrates that working region 1402. The largest interconnected working region 1402' which is rectangular in cross-section is illustrated in the pod 1401'. Although the pod 1401' in accordance with the state of the art is markedly larger than the pod 1401 according to an embodiment of the invention, it nonetheless has less compact interconnected free space, as is intended to be shown by that working region 1402'. The reason for this is that in the state of the art, a carrier structure, in particular a shaft journal 1404' and a machine carrier 1406', are arranged centrally within the pod 1401' and any free spaces can only be arranged distributed around that machine carrier 1406' or shaft journal 1404'.

In the case of the pod 1401 in accordance with an embodiment of the state of the art it is self-supporting and its actual shell thus forms the carrier structure and thus there is no further carrier structure. The entire inner region of the pod 1401 is thus substantially available for use for items of equipment and for people, in particular service personnel, to be present therein.

To illustrate the space requirement involved, further free spaces 1408 are also shown in the pod 1401, and further free spaces 1408' are shown in the pod 1401'.

Figure 15:
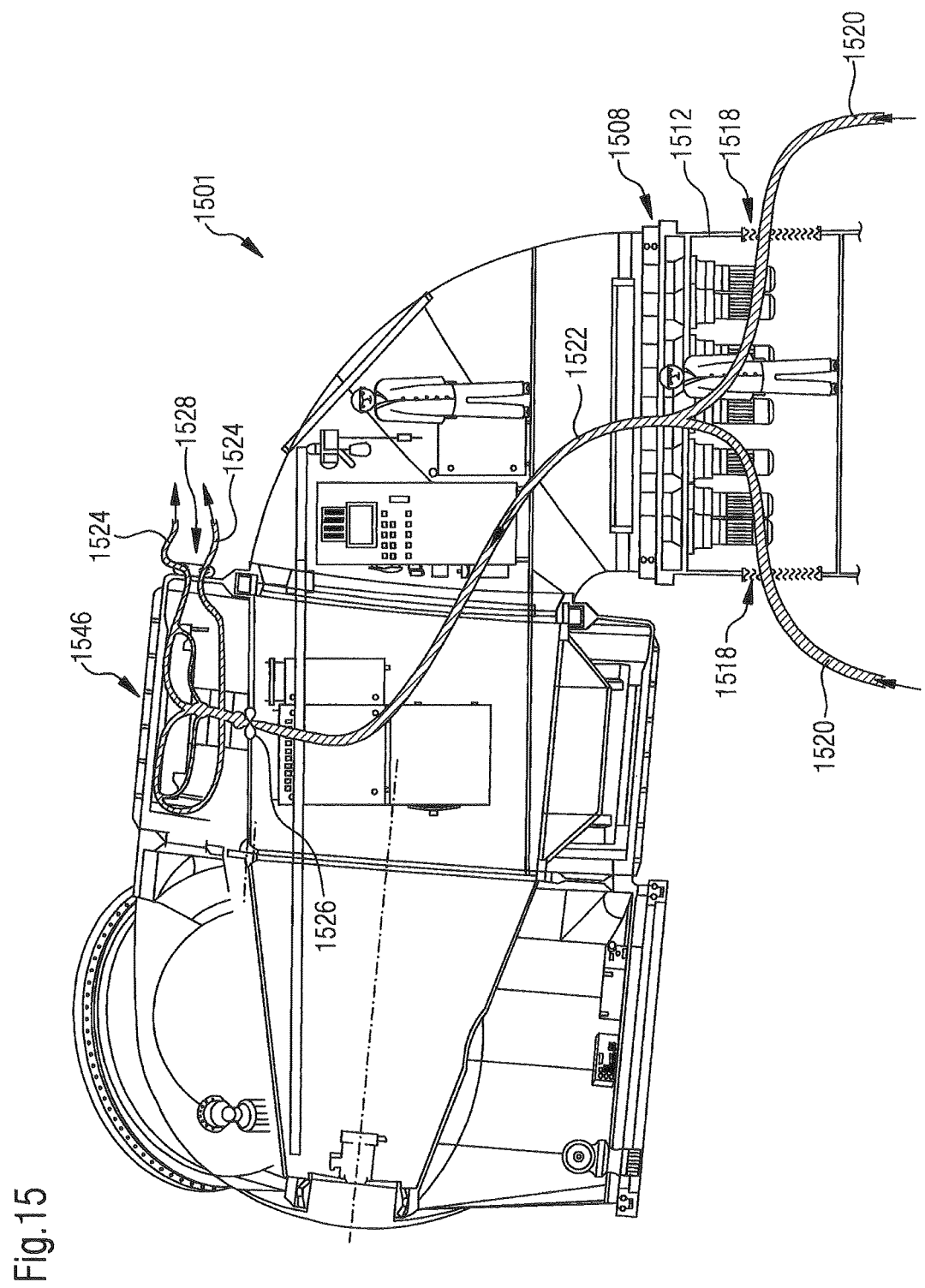
FIG. 15 shows a side view of a pod according to an embodiment of the invention to illustrate a cooling air flow.

The embodiment of FIG. 15 shows a possible form of cooling system. The pod 1501 is connected by way of an azimuth bearing 1508 to the pylon 1512, of which here only an upper part is shown. Flow entry openings 1518 are provided in the pylon 1512. Ambient air 1520 flows in through those flow entry openings 1518 and flows into the pod 1501 in the form of a cooling flow 1522 in the region of the azimuth bearing 1508. The cooling flow 1522 then goes to the generator 1546, flows therethrough and leaves the wind power installation in the form of heated exhaust air 1524.

In that respect FIG. 15 is only highly diagrammatically illustrated and shows cooling of the generator 1546 only in the upper region. In actual fact the generator 1546 extends substantially completely around the pod 1501 and cooling also takes place over the entire periphery of the generator 1546. The fan 1526 which is shown by way of example is disposed in usual operation not just at the one illustrated position, but a plurality thereof can be arranged in the peripheral direction around the generator 1546. In the region of the generator 1546 the pod 1501 can have flow discharge openings 1528 preferably arranged at the side of the pod 1501, that faces away from the wind.

FIGS. 16 and 17 show once again the structure of the pod 1601 according to an embodiment. The pod 1601 is fixed rotatably to the pylon 1612 with its pod curve region 1364 by way of an azimuth bearing 1608. At a rotor member casing portion 1676 the generator rotor member 1650 is rotatably mounted inter alia by way of a rear bearing 1670 at the pod curve region 1634.

Figure 16:
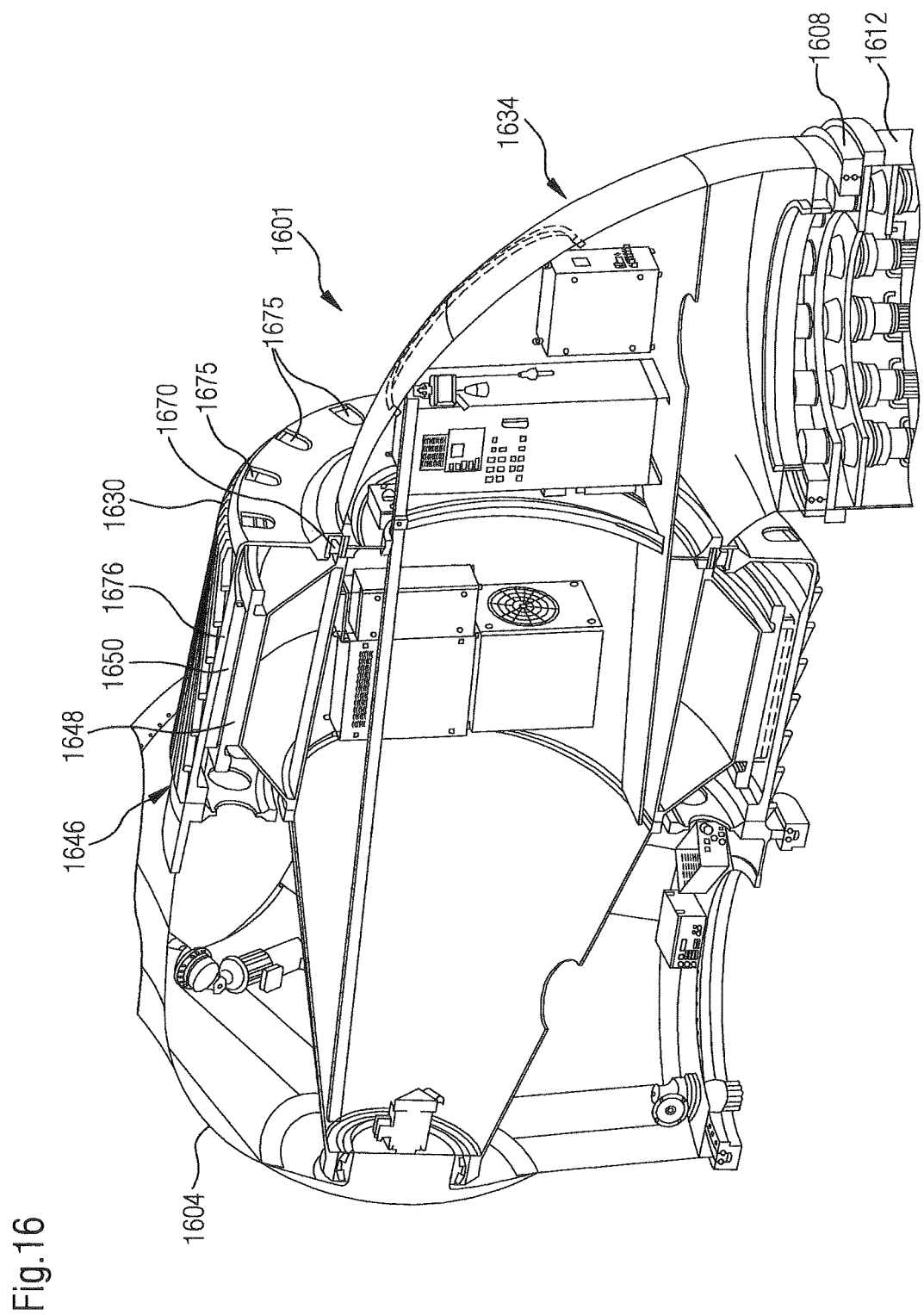
FIG. 16 shows a perspective sectional view of an embodiment of a pod according to the invention.
Figure 17:
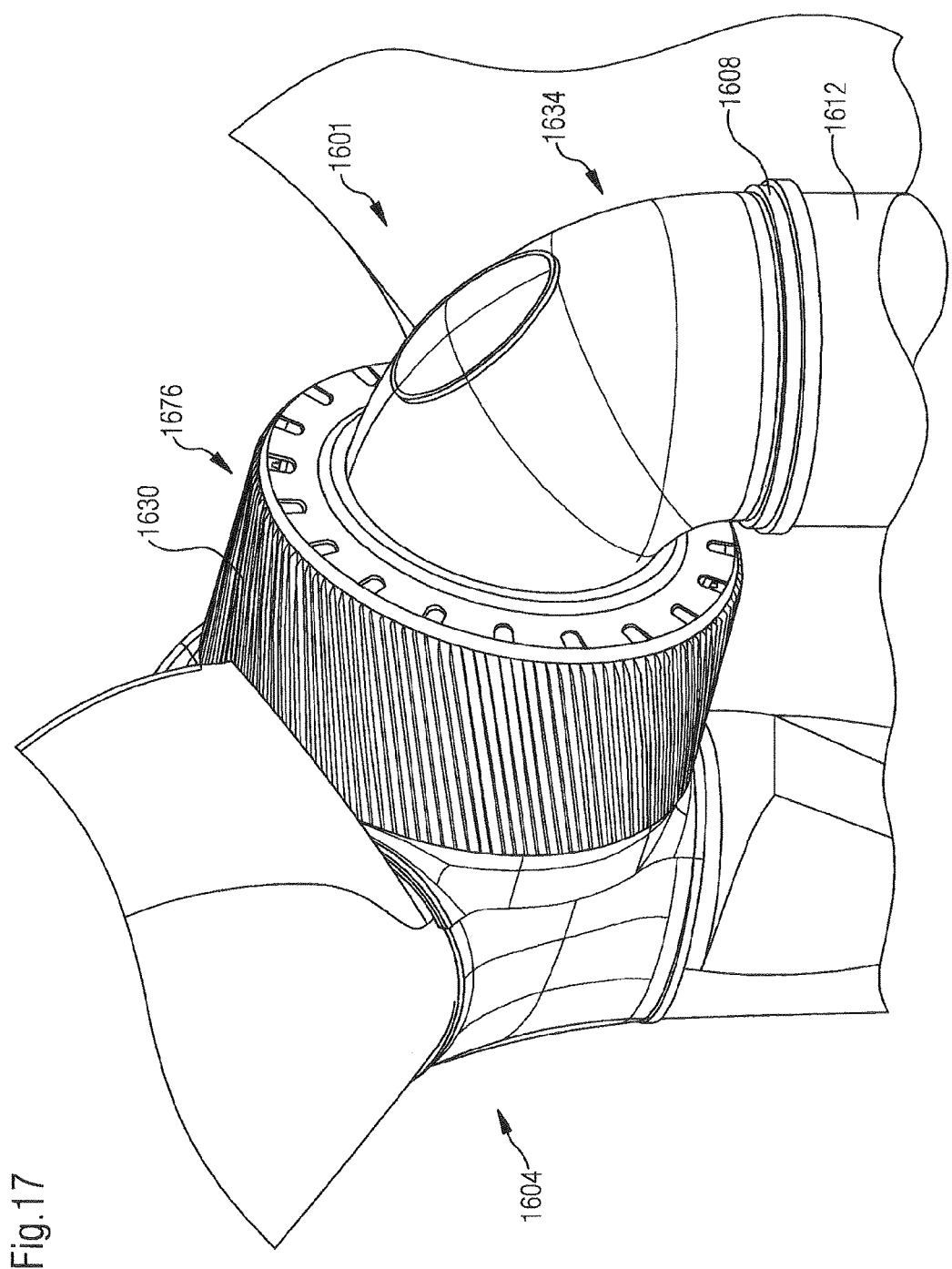
FIG. 17 shows a perspective non-sectioned view of the FIG. 16 embodiment.

The rotor member 1650 thus rotates relative to the stator 1648 which is arranged within the rotor member 1650. The stator 1648 and the rotor member 1650 basically form the generator 1646 which inter alia can be cooled by way of inclinedly arranged cooling ribs 1630. In this case the inclinedly disposed cooling ribs 1630 are substantially so inclined that, when the wind flows thereagainst, coming as shown in FIGS. 16 and 17 approximately from the left-hand side of the plane of the drawing, the ribs take account of rotation of the aerodynamic rotor or rotating part 1604 as occurs in regular operation of the installation. In that case, more specifically, the wind flows in a helical configuration in relation to the pod 1601 and those cooling ribs 1630 are oriented in relation thereto.

Arranged between the region of the cooling ribs 1630 and the rear bearing 1670 is an apron portion 1674 or a cover apron 1674 which also has apron openings 1675 through which cooling air, in particular exhaust air which has already been heated up cooling, can be discharged. In particular the cooling shown in FIG. 15 can issue in the form of a cooling flow through such apron openings 1675.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pod of a wind power installation, the wind power installation including a pylon or mast, an aerodynamic rotor, and a generator with a generator rotor member and a stator, the pod comprising:
a pod casing that includes a rotating part and a stationary part, the stator being coupled to the stationary part and the rotating part being coupled to the generator rotor member, the pod casing being an outer shell that is self-supporting, wherein the wind power installation is gearless such that the generator rotor member is rotated without mechanical transmission by the aerodynamic rotor.

2. The pod according to claim 1 wherein the pod casing fully supports the generator.

3. The pod according to claim 1 wherein the pod casing is coupled to the pylon without a machine carrier there between.

4. The pod according to claim 1 wherein the rotating part supports at least one rotor blade of the aerodynamic rotor and the generator rotor member of the generator, wherein the stationary part supports the stator of the generator; wherein the rotating part and the stationary part are made entirely or partially from steel or aluminum.

5. The pod according to claim 1 wherein the generator rotor member is located outwardly of the stator.

6. The pod according to claim 1 further comprising a ring gear fixedly connected to the pod and having an internal tooth arrangement for azimuth adjustment of the pod, the ring gear adapted so that at least one azimuth drive is fixedly arranged in the pylon and engage with a respective pinion on the ring gear with the internal tooth arrangement.

7. The pod according to claim 1 further comprising a working platform extending through an interior portion of the generator.

8. The pod according to claim 1 wherein the generator has a nominal power output of over 1MW.

9. The pod according to claim 1 wherein the pod is sized to allow a person to stand within the pod casing.

10. The pod according to claim 1 wherein the generator rotor member has a nominal rotating speed of 5 to 25 revolutions per minute, wherein the stator has at least 48 stator poles.

11. The pod according to claim 1 wherein the pod casing has
a shaft journal portion arranged in a region of the generator and the aerodynamic rotor for carrying the generator and the aerodynamic rotor, and
a connecting portion connecting the shaft journal portion to the pylon, the connecting portion having an outer shape that is angled or curved from the pylon to the shaft journal portion.

12. The pod according to claim 1 wherein the rotating part of the pod casing has blade connections for fixing a respective rotor blade to the rotating part, the blade connections extending in an axial direction over a blade connecting region.

13. A wind power installation comprising:
a pylon or mast:
a generator that includes a stator and a rotor member; and
a pod having an outer pod casing that includes a rotating part and a stationary part, the generator coupling the rotating part of the pod casing to the stationary part of the pod casing, the stationary part of the casing having a smaller diameter than the rotating part, the pod casing being an outer shell that is self-supporting without internal support structures extending through an interior portion for supporting the pod casing.

14. The wind power installation according to claim 13 wherein at least one azimuth drive is fixedly arranged in the pylon or mast and engage with a respective pinion on a ring gear which is fixedly connected to the pod and has an internal tooth arrangement.

15. A method of constructing a wind power installation, the method comprising:
coupling a stationary part of a pod to a pylon;
forming a generator by coupling a generator rotor member to a stator with a bearing, wherein the generator rotor member is coupled outwardly of the stator;
coupling the generator to the stationary part of the pod; and
coupling a rotary part of the pod to the generator.

16. The method according to claim 15 wherein the stator, generator rotor member and the bearing coupling the stator and the rotor member are prefabricated at a factory or on a building site on a ground.

17. The method according to claim 15 further comprising installing electric devices in the rotating part of the pod prior to coupling the pod to the generator.

18. The wind power installation according to claim 13, wherein the generator couples the rotating part of the pod casing to the stationary part.

* * * * *